US008690079B2

(12) United States Patent
MacLean-Blevins

(10) Patent No.: US 8,690,079 B2
(45) Date of Patent: Apr. 8, 2014

(54) SYSTEM FOR FAILSAFE CONTROLLED DISPENSING OF LIQUID MATERIAL

(76) Inventor: Mark MacLean-Blevins, Westminster, MD (US)

( * ) Notice: Subject to any disclaimer, the term of this patent is extended or adjusted under 35 U.S.C. 154(b) by 512 days.

(21) Appl. No.: 12/488,897

(22) Filed: Jun. 22, 2009

(65) Prior Publication Data

US 2009/0250527 A1 Oct. 8, 2009

Related U.S. Application Data

(62) Division of application No. 11/268,608, filed on Nov. 8, 2005, now Pat. No. 7,566,013.

(51) Int. Cl.
*B05B 7/26* (2006.01)
*F16K 35/00* (2006.01)

(52) U.S. Cl.
USPC ........... 239/310; 239/581.1; 239/407; 251/94

(58) Field of Classification Search
CPC ........................................................ F16K 35/00
USPC .............. 239/310, 570, 581.1, 318, 353, 354, 239/407, 410, 413, 414, 415, 416.2, 416.3, 239/340, 341, 574; 251/50, 53, 57, 94
See application file for complete search history.

(56) References Cited

U.S. PATENT DOCUMENTS

| | | | |
|---|---|---|---|
| 260,829 | A | 7/1882 | Bradley |
| 372,503 | A | 11/1887 | Wheeler |
| 2,719,704 | A | 10/1955 | Anderson et al. |
| 2,770,501 | A | 11/1956 | Coanda |
| 2,780,232 | A | 2/1957 | Ney |
| 2,788,244 | A | 4/1957 | Gilmour |
| 2,988,139 | A | 6/1961 | Coanda |
| 3,255,972 | A | 6/1966 | Hultgren et al. |
| 3,381,899 | A | 5/1968 | Forsman |
| 3,561,680 | A | 2/1971 | Ott |
| 3,666,150 | A | 5/1972 | Liljeholm |
| 3,763,888 | A | 10/1973 | Duecker |
| 3,770,205 | A | 11/1973 | Proctor et al. |
| 3,863,843 | A | 2/1975 | Hechler, IV |
| 3,929,150 | A | 12/1975 | Flinner et al. |
| 3,940,069 | A | 2/1976 | Gunzel, Jr. et al. |
| RE29,405 | E | 9/1977 | Gunzel, Jr. et al. |
| 4,047,541 | A | 9/1977 | Mercier et al. |
| 4,105,044 | A | 8/1978 | Davitt |

(Continued)

OTHER PUBLICATIONS

"Miracle-Gro Liqua Feed".

*Primary Examiner* — Jason Boeckmann
(74) *Attorney, Agent, or Firm* — Rosenberg, Klein & Lee

(57) ABSTRACT

A system and method are provided for selectively containing and dispensing a predetermined liquid material in and from a source container in failsafe manner, wherein a housing is disposed to receive a pressurized fluid stream, and a selectively operable valve assembly is disposed in a flow path defined in the housing. The housing includes an inlet, an outlet, and an intermediate portion extending therebetween, which is formed with an admission port for admitting the predetermined liquid material. The valve assembly is disposed between the housing's inlet and outlet, and may be selectively operated to alternatively open and close access of the predetermined liquid material into the housing. The valve assembly is operably actuated responsive at least in part to the pressurized fluid stream in the flow path, whereby admission of the predetermined liquid material into said housing is keyed by introduction of the pressurized fluid stream into the flow path.

6 Claims, 22 Drawing Sheets

(56) References Cited

U.S. PATENT DOCUMENTS

| | | | | |
|---|---|---|---|---|
| 4,142,545 | A | 3/1979 | Billigmeier | |
| 4,142,681 | A | 3/1979 | Hechler, IV | |
| 4,154,258 | A | 5/1979 | Duda et al. | |
| 4,176,680 | A | 12/1979 | de Launay | |
| 4,197,872 | A | 4/1980 | Parker | |
| 4,244,494 | A | 1/1981 | Colgate et al. | |
| 4,369,921 | A | 1/1983 | Beiswenger et al. | |
| 4,446,887 | A | 5/1984 | Redmon et al. | |
| 4,475,689 | A | 10/1984 | Hauger et al. | |
| 4,508,272 | A | 4/1985 | Thompson | |
| 4,527,740 | A | 7/1985 | Gunzel, Jr. et al. | |
| 4,736,891 | A | 4/1988 | Chow et al. | |
| 4,750,674 | A | 6/1988 | Chow et al. | |
| 4,775,241 | A | 10/1988 | Stuckey | |
| 4,811,900 | A | 3/1989 | LaRosa et al. | |
| 4,826,085 | A | 5/1989 | Chow et al. | |
| 4,883,086 | A | 11/1989 | Lejnar | |
| 4,901,923 | A | 2/1990 | McRoskey et al. | |
| 4,971,105 | A | 11/1990 | McGuire | |
| 5,007,588 | A | 4/1991 | Chow et al. | |
| 5,039,016 | A | 8/1991 | Gunzel, Jr. et al. | |
| 5,085,039 | A | 2/1992 | Shekleton | |
| 5,100,059 | A | 3/1992 | Englhard et al. | |
| 5,129,730 | A | 7/1992 | Someah et al. | |
| 5,213,129 | A | 5/1993 | Someah et al. | |
| 5,213,265 | A | 5/1993 | Englhard et al. | |
| 5,293,946 | A | 3/1994 | Besson et al. | |
| 5,303,853 | A | 4/1994 | Nye | |
| 5,320,288 | A | 6/1994 | Ketcham, Jr. | |
| 5,372,310 | A | 12/1994 | Ketcham | |
| 5,375,769 | A | 12/1994 | Schultz | |
| 5,383,603 | A * | 1/1995 | Englhard et al. | 239/314 |
| 5,388,767 | A | 2/1995 | Moses | |
| 5,533,546 | A | 7/1996 | Dixon | |
| 5,632,294 | A * | 5/1997 | Benton | 137/1 |
| 5,799,688 | A | 9/1998 | Yie | |
| 5,799,831 | A | 9/1998 | Spriggs et al. | |
| 5,881,955 | A | 3/1999 | Styne | |
| 5,996,700 | A | 12/1999 | Sulmone | |
| 6,012,650 | A | 1/2000 | Hadar | |
| 6,283,330 | B1 | 9/2001 | Gillespie et al. | |
| 6,283,385 | B1 | 9/2001 | Beaver et al. | |
| 6,345,773 | B1 | 2/2002 | Shanklin et al. | |
| 6,378,785 | B1 * | 4/2002 | Dodd | 239/318 |
| 6,425,534 | B2 | 7/2002 | Ketcham et al. | |
| 6,471,141 | B2 | 10/2002 | Smith et al. | |
| 6,578,776 | B1 | 6/2003 | Shanklin et al. | |
| 6,772,966 | B2 | 8/2004 | Foster et al. | |
| 2005/0103893 | A1 | 5/2005 | Birrenkott et al. | |

* cited by examiner

SYSTEM FOR FAILSAFE CONTROLLED DISPENSING OF LIQUID MATERIAL

RELATED APPLICATIONS

This Application is a Divisional of U.S. application Ser. No. 11/268,608, filed 8 Nov. 2005.

BACKGROUND OF THE INVENTION

1. Field of the Invention

The present invention is generally directed to the controlled dispensing of liquid materials. More specifically, it is directed to the failsafe control of such dispensing, reliably guarding against the inadvertent or unauthorized release of such liquid materials as potentially hazardous chemical compositions from containment, except when appropriate. The present invention is directed, moreover, to a system and method by which dispensing is effected in a manner responsive to a suitable pressurized stream of fluid.

Dispensing control devices of the type used with a pressurized stream of fluid, such as water provided through a conventional garden hose or other delivery means, are widely used in many applications. One example is a spray nozzle attachment for a garden hose which serves also as a dispensing assembly and capping means for a container of fertilizer, weed/pest control, or other highly concentrated lawn or garden treating chemical. Another example of the many applications is a sprayer attachment which controls the sprayed dispensing of liquid material from an air pump-type container.

Such dispensing control devices are typically activated to dispense the given material properly only when a pressurized stream of water or other appropriate fluid is provided. In situations where the pressurized fluid stream is not present, dispensing of the liquid material would invariably be inappropriate and all too often quite hazardous. On store shelves, for instance, containers of various liquid chemicals are displayed within easy reach of even small children. Despite the chemical materials' toxicity and noxious properties, the containers are often displayed in ready-to-use form, capped by nothing more than the dispensing control devices already placed on them.

The dispensing control devices are usually equipped with closure mechanisms and seals; however, they are prone to accidental or mischievous opening when knocked over, carelessly handled by a curious customer, or otherwise tampered with. The closures and seals of the type heretofore known may be defeated in this manner, whereupon potentially hazardous release of the contained chemical liquid may occur. Such a chemical spill is hazardous to the child as well as to other persons and animals in the area, including those who must clean up such a toxic spill. The resultant risk of serious, even fatal, injury due to poisoning, chemical burn, toxic inhalation, and the like potentially occurring in that event is self-evident.

There exists, therefore, a need for an approach to dispensing a liquid material which cannot be readily defeated by tampering or other disturbance. There exists a need, moreover, for a system and method of controlled dispensing which safely guards against the inadvertent or unauthorized release of the given liquid material until and unless the conditions for its safe release and use are actually present.

2. Prior Art

Closure devices for liquid product containers are known in the art, as are devices for controlling the dispensing of liquid products from containment. The best prior art known to Applicant include: U.S. Pat. Nos. 3,863,843; 4,244,494;

5,996,700; 4,971,105; 4,527,740; 5,007,588; 4,811,900; 4,508,272; 4,901,923; 5,375,769; 6,471,141; 6,435,773; 5,388,767; 4,142,681; 6,012,650; 5,533,546; 5,881,955; 3,940,069; 3,929,150; 3,763,888; 3,561,680; 4,176,680; 4,883,086; 4,105,044; 4,142,545; 4,154,258; 4,197,872; 4,775,241; 5,799,688; 4,047,541; 5,039,016; 5,100,059; 5,213,265; 5,320,288; 5,372,310; 5,383,603; 6,283,385; 6,378,785; 6,578,776; 4,826,085; 5,303,853; 3,666,150; 5,213,129; 5,129,730; 2,770,501; 5,293,946; 5,085,039; 2,988,139; 4,971,105; 3,863,843; 372,503; and, RE29,405. Such devices fail to provide the unique combination of features and advantages for failsafe closure and controlled dispensing of liquid materials to the degree provided by the present invention.

Numerous concentrated liquid products are now manufactured and sold in a retail environment in ready-to-use packaged containers (including bottles). Many are capped with sprayer type dispensing mechanisms configured for attachment to the end of a hose. Such sprayer type mechanisms serve to dilute the concentrated liquid product as it is dispensed, by an appropriate mixture ratio with the pressurized stream of water emerging from the hose. They serve also to expel the diluted mixture for appropriate application. Examples of uses widely found for this type of storage and dispensing of liquid products include lawn or garden care and weed/pest control, automobile cleaning, structural siding material cleaning, and so on.

A notable problem plaguing mechanisms of this type derive from the fact that they function as the ultimate closure for the concentrated chemical liquid product's container. Most of the currently available sprayer devices provide for some degree of chemical containment in that they offer an "off" setting, whereby the container is sealed for shipping and storage. Some mechanisms provide additional safety measures—like hydrophobic venting means to allow "breathing" of the container contents and thereby prevent the generation or build up of noxious vapors while stored. Others incorporate protective measures such as child-proof locking structures.

Still, the mechanisms heretofore known in the art fail to provide adequate safeguards against mechanical defeat and manipulation inappropriately away from its "off" setting. Nor do they adequately ensure failsafe re-sealing of the container following initial use of its product.

Hence, there remains a need for a controlled dispensing approach whereby dispensing is ultimately enabled independent of any mechanical means externally accessible to user manipulation. There remains a need for such controlled dispensing approach which actuates automatically, to control dispensing in a certain condition-responsive manner.

SUMMARY OF THE INVENTION

It is a primary object of the present invention to provide a system and method for controlled dispensing of a liquid material which cannot be readily defeated by tampering or other disturbance.

It is another object of the present invention to provide a system and method which permits the liquid material to be dispensed only at the time of actual intended use.

It is another object of the present invention to provide a system and method for controlled dispensing of the liquid material in a manner responsive to a suitably pressurized stream of fluid directed thereto.

These and other objects are attained by the present invention in a system for failsafe controlled dispensing of a predetermined liquid material from a source container. The system generally comprises a housing for receiving a pressurized fluid stream and a selectively operable valve assembly disposed in a flow path defined therein. The housing includes an inlet, an outlet, and an intermediate portion extending therebetween, which is formed with an admission port for admitting the predetermined liquid material. The valve assembly is disposed between the housing's inlet and outlet, and may be selectively operated to alternatively open and close access of the predetermined liquid material into the housing. The valve assembly is operably actuated responsive at least in part to the pressurized fluid stream in the flow path, whereby admission of the predetermined liquid material into said housing is keyed by introduction of the pressurized fluid stream into the flow path.

In accordance with one aspect of the present invention, various embodiments incorporate a method for selectively containing and dispensing a predetermined liquid material in failsafe manner which generally comprises among its combination of steps that of establishing a first source containing the predetermined liquid material and establishing a second source of a pressurized fluid stream. The method also includes the steps of attaching a housing to the first and second sources for receiving the pressurized fluid stream and controlling responsive thereto release of the predetermined liquid material from the first source. The housing defines an admission port for selectively admitting the predetermined liquid material therethrough, as well as a flow path for the pressurized fluid stream. The method further includes the step of selectively operating a valve assembly disposed in the housing's flow path, the valve assembly being selectively operated to alternatively open and close access of the predetermined liquid material into the housing. When the pressurized fluid stream is directed into the flow path, the valve assembly is operably actuated responsive at least in part to such pressurized fluid stream. Admission of the predetermined liquid material into the housing is thereby keyed by introduction of the pressurized fluid stream into the housing's flow path.

In certain embodiments, the valve assembly may be selectively enabled/disabled and set between active and inactive configurations. Full operable actuation of the valve assembly requires in those embodiments both enabling and setting to the active configuration. In some of those embodiments, the selective enabling of the valve assembly is automatically controlled responsive to the pressurized fluid stream directed into the housing. In others of those embodiments, the selective setting of the valve assembly to its active configuration is automatically controlled responsive to the pressurized fluid stream directed into the housing.

DETAILED DESCRIPTION OF THE PREFERRED EMBODIMENTS

In overall operation, the failsafe dispensing system of the present invention serves the crucial function of controlling the safe release of potentially hazardous liquid materials from containment. It safeguards against the accidental or unauthorized release of the liquid material by operably coupling to the liquid material's source a valve assembly which cannot be fully actuated to permit the material's release without sufficient exposure to a suitably pressurized stream of fluid. In the absence of such pressurized fluid stream, the valve assembly remains un-actuated, preserving the closure of a container or other source from which the liquid material is to be dispensed. In accordance with the present invention, this closure cannot be readily defeated by manipulating or otherwise tampering with the valve assembly mechanically, by tipping the container, or by such other common means.

In many applications, a pressurized flow of water or other fluid is necessary in any event at the time of the liquid material's dispensing and use. In typical lawn and garden applications, for instance, the contained liquid material may be a highly concentrated fertilizer, insecticide, weed killer, or other such chemical formulation requiring a stream of water for dilution and/or transport. Release of the contained liquid material is then actuable only after the necessary preparations for the material's use, like attaching a garden hose or other conduit to deliver the pressurized fluid stream to the valve assembly, have actually been made. That is, dispensing of the liquid material is advantageously permitted only at the time of actual intended use.

Preferably, certain other measures are employed with the valve assembly for not only directing the pressurized fluid stream to and from the valve assembly effectively, but also for disabling the valve assembly from actuation, even when the pressurized fluid stream is present. This serves as an added safeguard which also enhances the degree of selectivity and control to the user. Such measures may be realized in the form of a simple locking mechanism upon the valve assembly, for example, or in various other forms as illustrated in following paragraphs.

Figure 11:
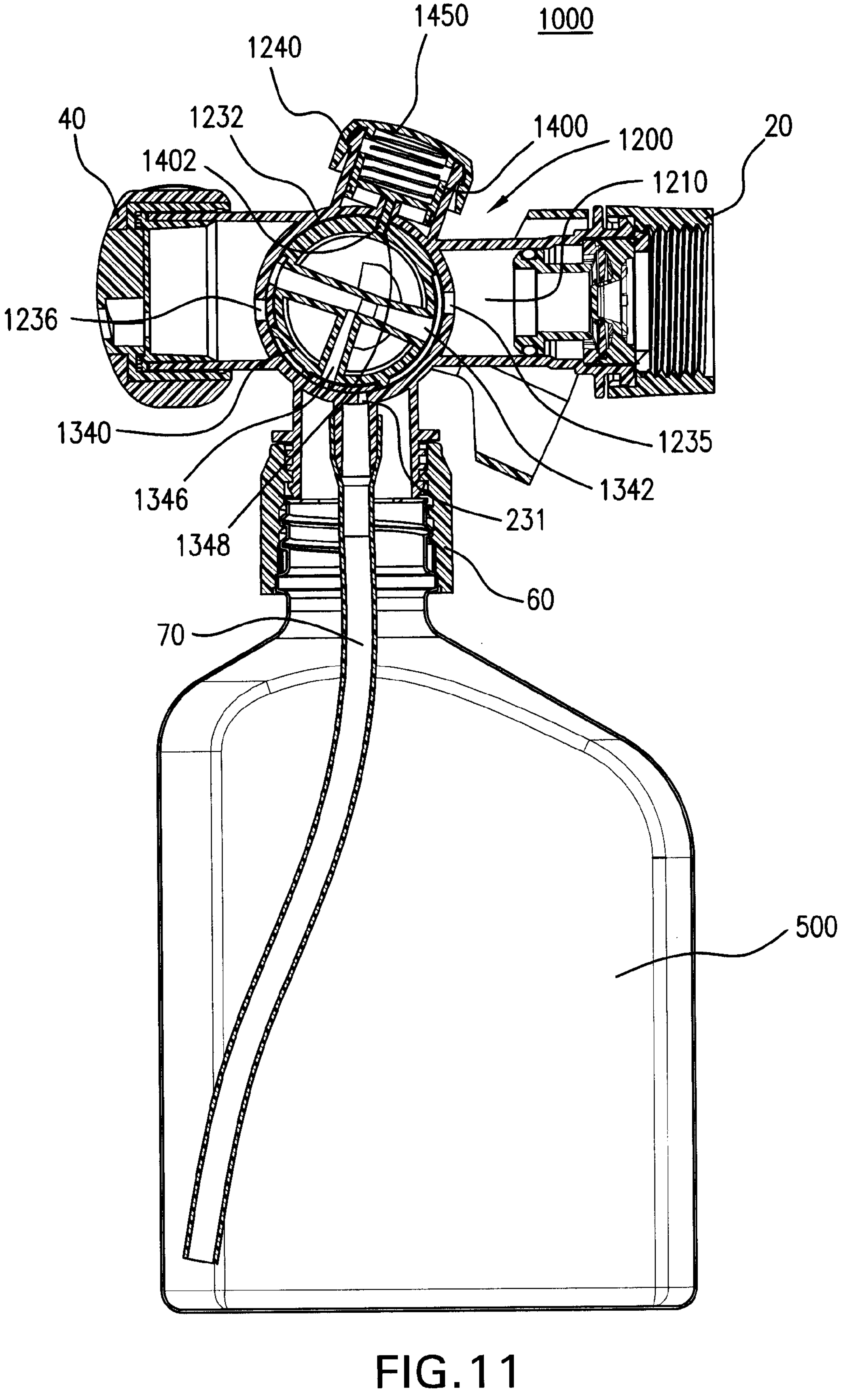
FIG. 11 is an elevational sectional view of the embodiment as shown in FIG. 8 attached to a liquid material container.

The source container for the liquid material (such as illustratively shown in FIGS. 8 and 11) may be of any suitable type known in the art. One common type is that of a portable dispensing jar which attaches to the system's housing to remain during use suspended therefrom, at the end of the hose. In certain other embodiments, the container may be formed to actually house the given valve assembly, the integrated valve assembly enjoying the added protection of the container against direct unwanted access.

Referring now to FIGS. 1-4, there is shown one exemplary embodiment of a failsafe dispensing system 100 for safe controlled dispensing of a liquid material from its container or other storage source. In the disclosed embodiment, the system is of the type which invokes an aspiration-based technique (exploiting a Venturi effect, a flow-by effect, a Coanda effect, or the like) to draw the liquid material from its container for mixing and delivery to the targeted organism or material. This is but one example of numerous embodiments in which the failsafe controlled dispensing system 100 may be realized in accordance with the present invention.

In the illustrative embodiment shown, system 100 is formed as a sprayer attachment of a type typically fitted to the end of a garden hose, which expels with the fluid stream supplied by the hose a liquid material drawn from an attached holding container. As such, system 100 generally comprises a housing 200 preferably having a hose coupling 20 and back-flow prevention device 80 connected at its inlet 210, and a spray nozzle 40 connected at its outlet 220. An intermediate portion 230 of the housing 200 is formed with a coupling structure 240 which surrounds and extends from an admission port 231. An adapter 60 is preferably provided at a neck portion of the coupling structure 240 to facilitate attachment of, for example, a bottle-like container supplying the given liquid material. During use, the liquid material is drawn through the admission port 231 and into the housing's intermediate portion 230 for mixture with the hose-supplied fluid stream.

Devices such as the back-flow prevention device and spray nozzle 40 are shown in the FIGS. for illustrative purposes only, as they are not important to the present invention. The structure and function of such devices are well known to those skilled in the art, are not further described herein. Moreover, in the interest of brevity and clarity, they are not necessarily shown in the FIGS. in precise configurational detail.

System 100 also includes a control valve mechanism 300 and a response valve mechanism 400, both disposed within the housing's intermediate portion 230. In the exemplary embodiment shown, the control valve 300 serves the general function of selectively directing a pressurized fluid stream received through the inlet 210 in accordance with one of numerous configurations. Preferably, the control valve 300 may be alternatively set at least to open, bypass, and closed configurations. Depending in part on the prevailing configuration of the control valve 300, and in part on the supply of a suitably pressurized flow of fluid (typically though not necessarily water in the embodiment shown) through the inlet 210, the response valve 400 is maintained in one of at least two operational configurations—namely, active and inactive configurations. The response valve 400 in either configuration conveys any fluid received from the control valve 300 on to the outlet 220 for expulsion, but only in the active configuration permits the liquid material to be admitted into the housing 200 for mixture and expulsion with that fluid.

Figure 1:
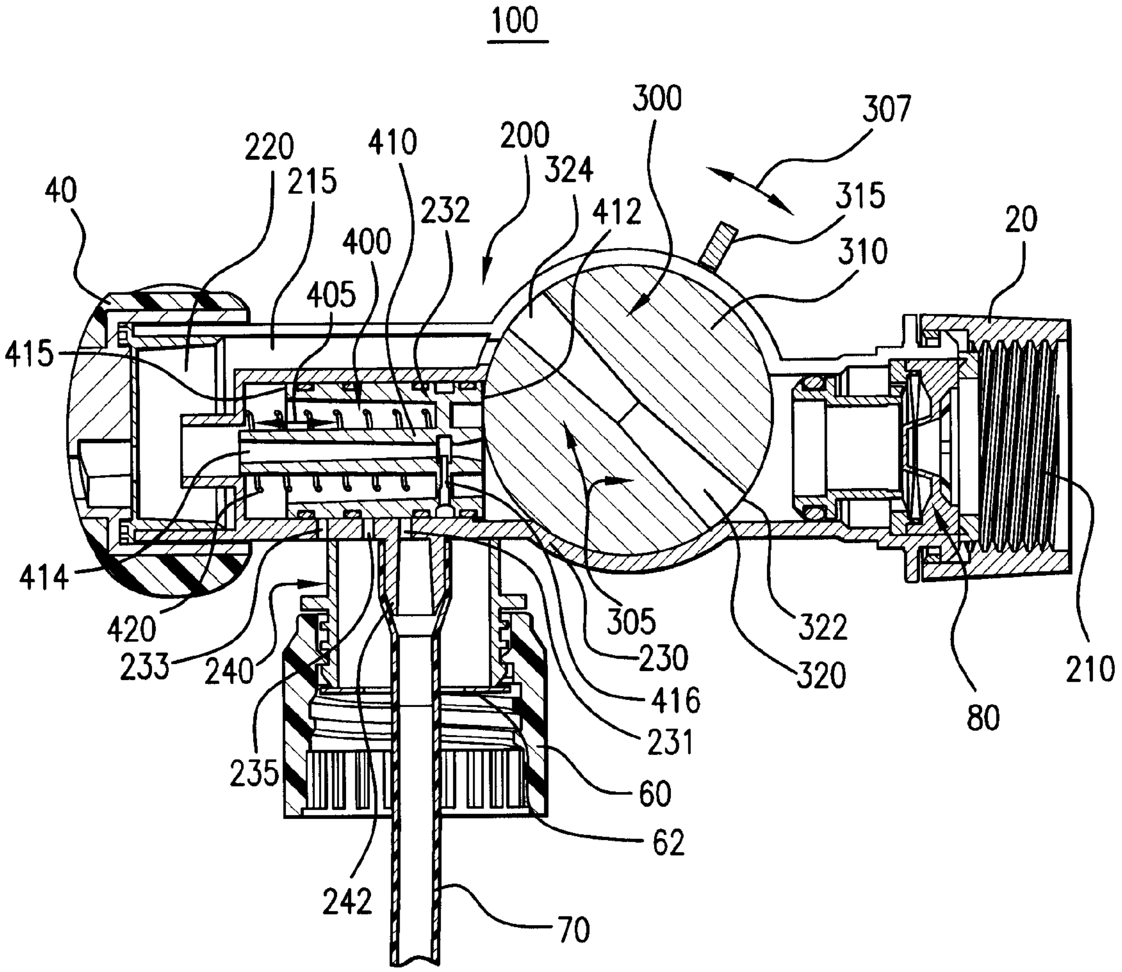
FIG. 1 is a sectional view of one embodiment of a system formed in accordance with the present invention, in an off configuration.
Figure 1A:
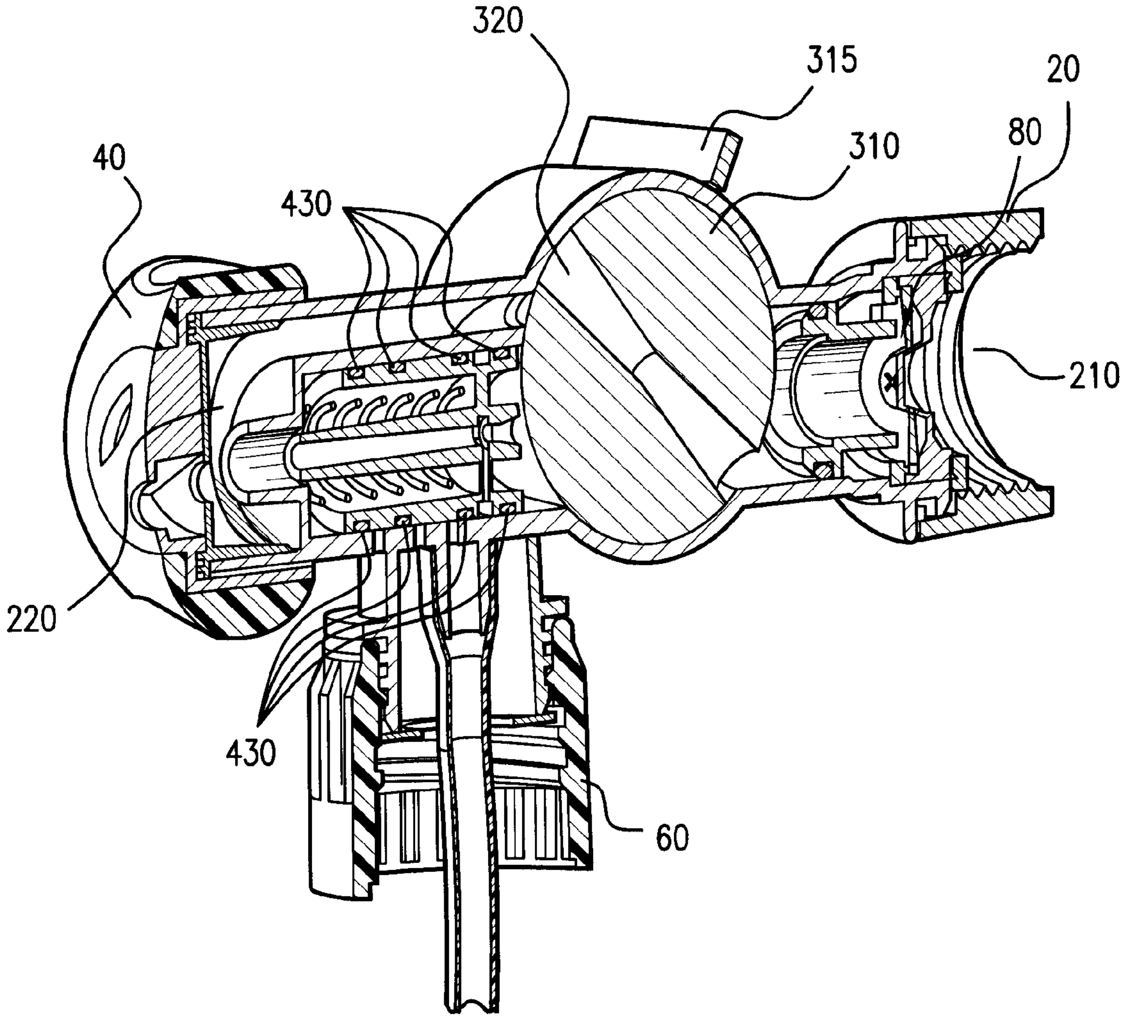
FIG. 1A is a front perspective sectional view corresponding to the embodiment as illustrated in FIG. 1.
Figure 2:
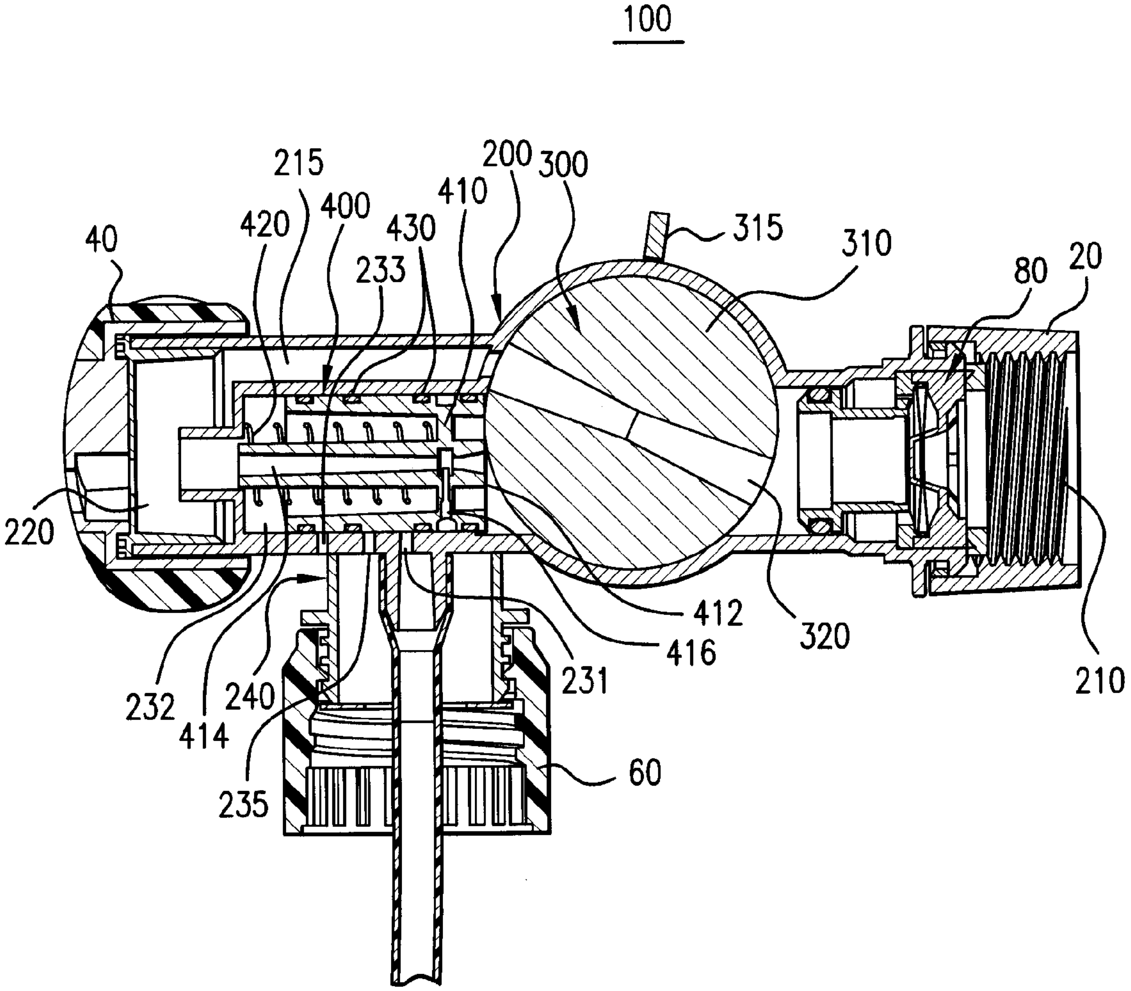
FIG. 2 is a sectional view of the embodiment shown in FIG. 1, in a bypass configuration.
Figure 2A:
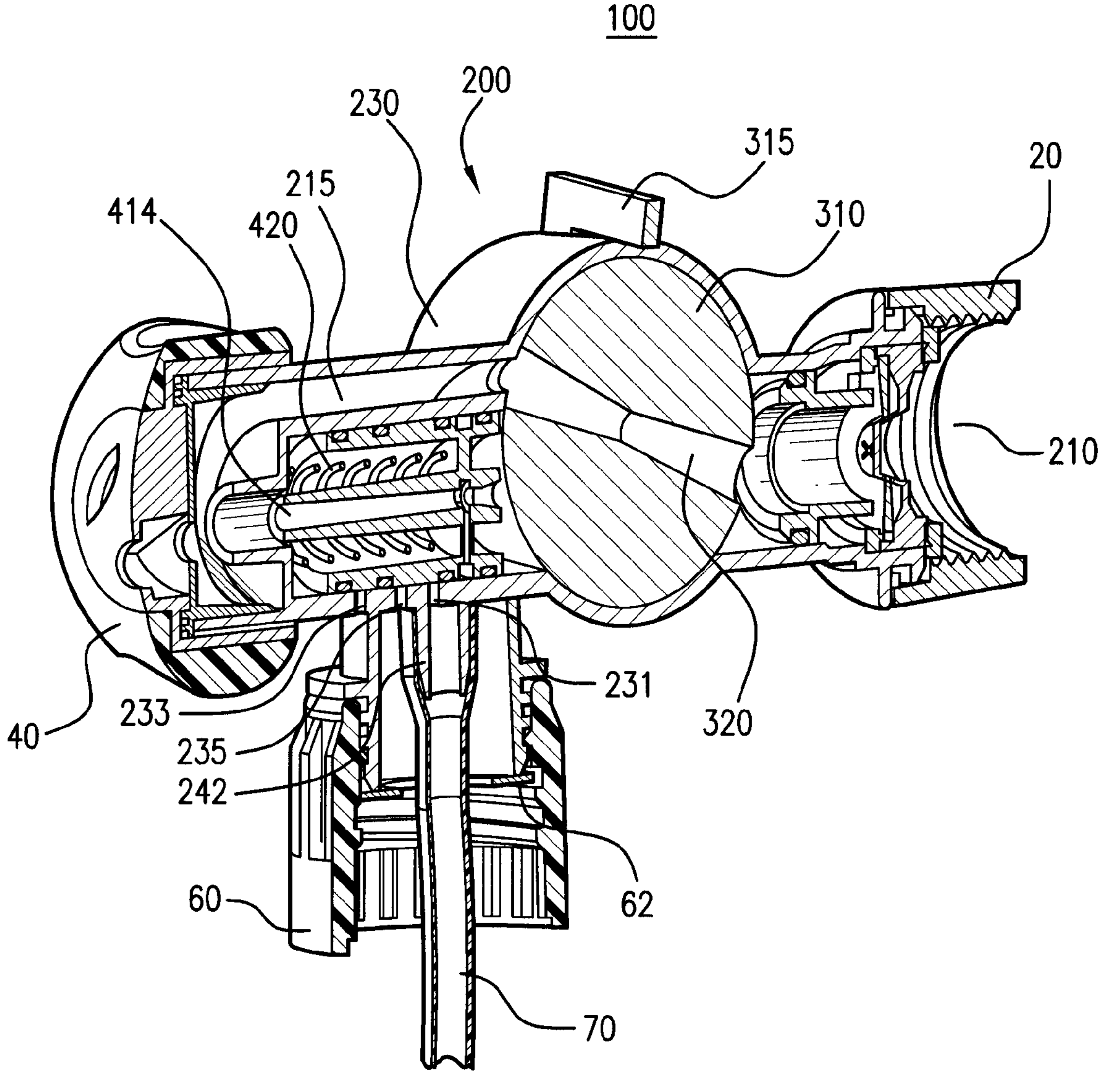
FIG. 2A is a front perspective sectional view corresponding to the embodiments as illustrated in FIG. 2.
Figure 3:
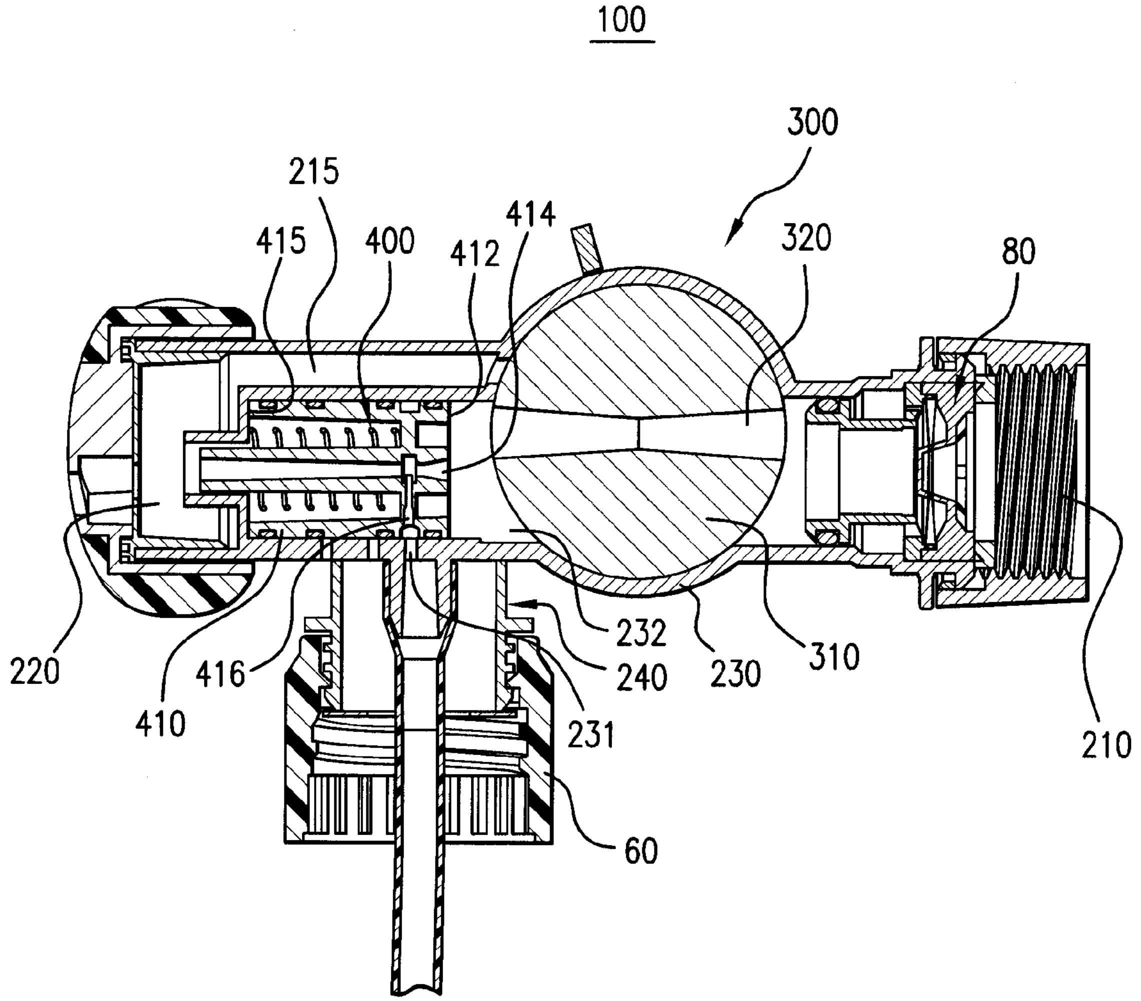
FIG. 3 is a sectional view of the embodiment show in FIG. 1, in an ON configuration.
Figure 3A:
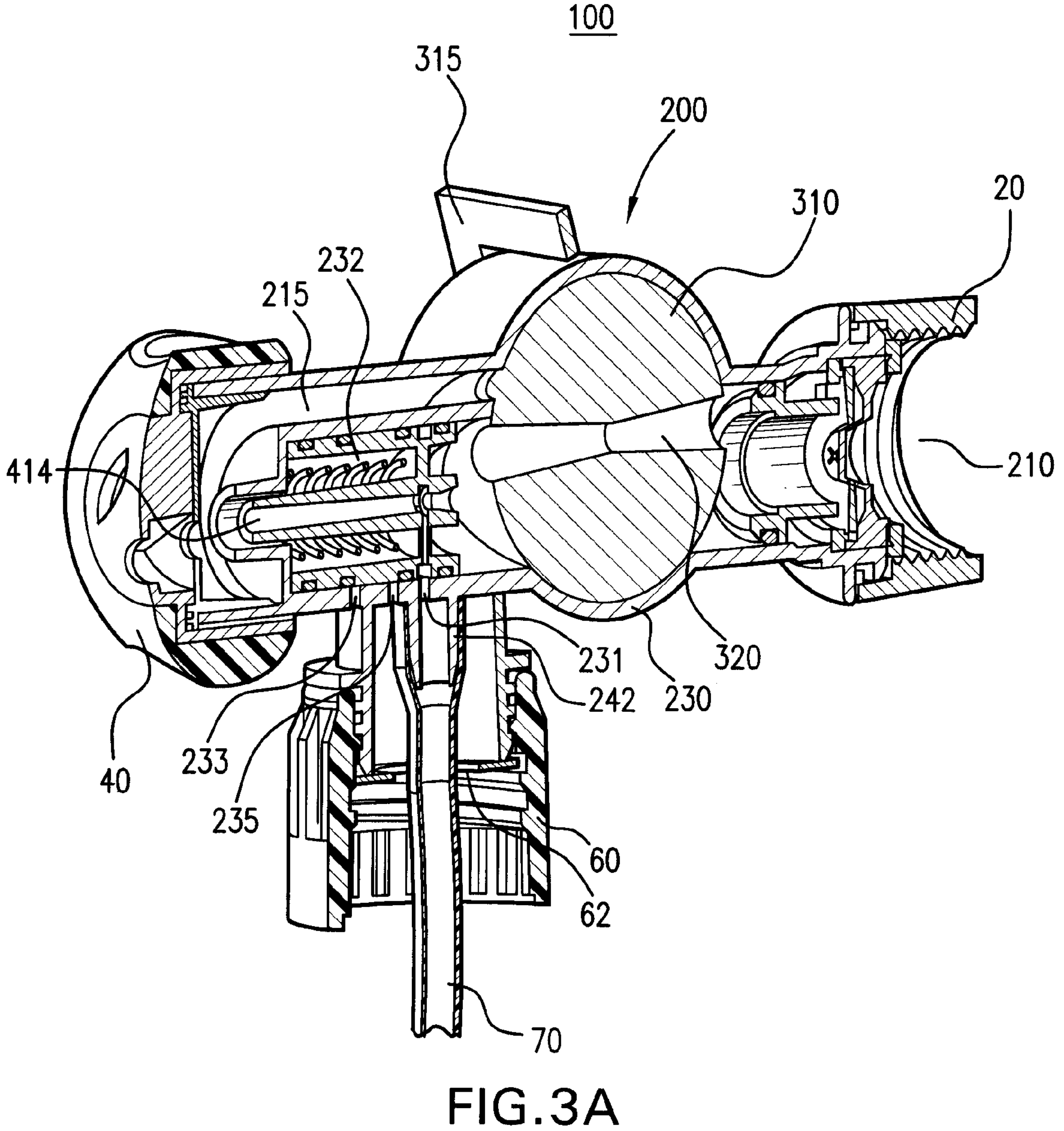
FIG. 3A is a front perspective sectional view corresponding to the embodiments as illustrated in FIG. 3.
Figure 4:
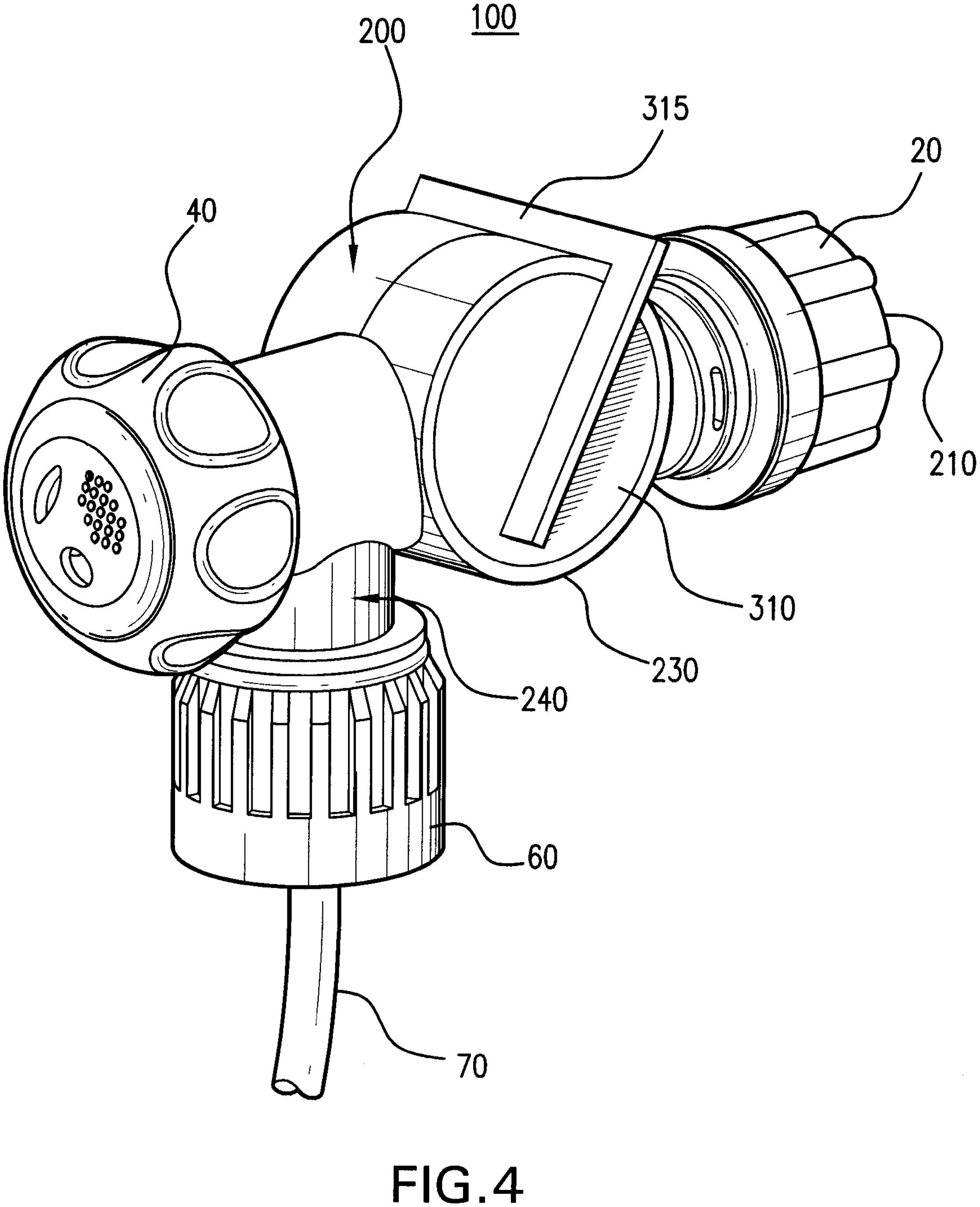
FIG. 4 is a front perspective view of the embodiment as illustrated in FIG. 1.
Figure 5:
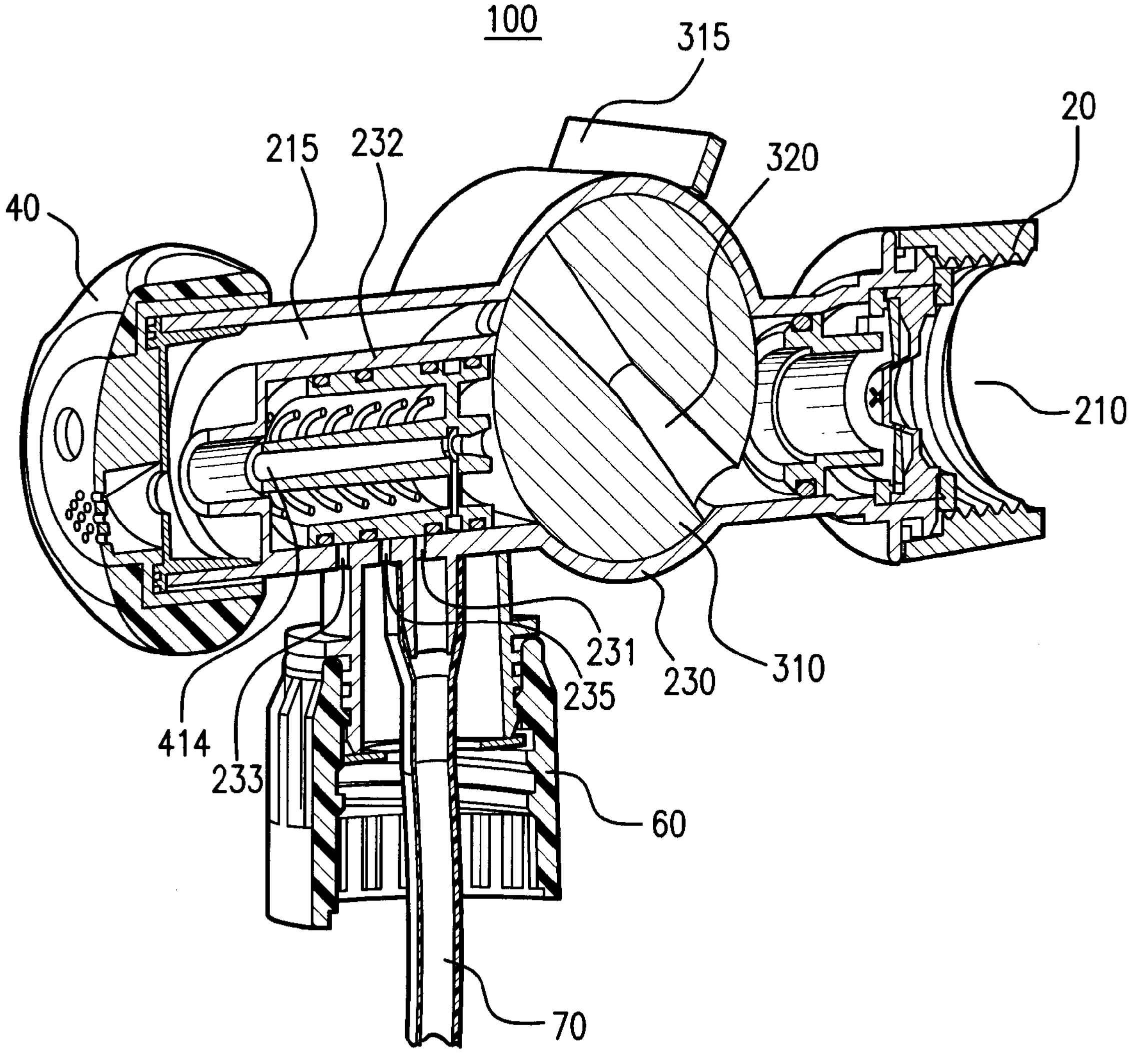
FIG. 5 is a front perspective sectional view corresponding to the embodiment as illustrated in FIG. 1, but with a front spray nozzle rotated to a different setting.
Figure 6:
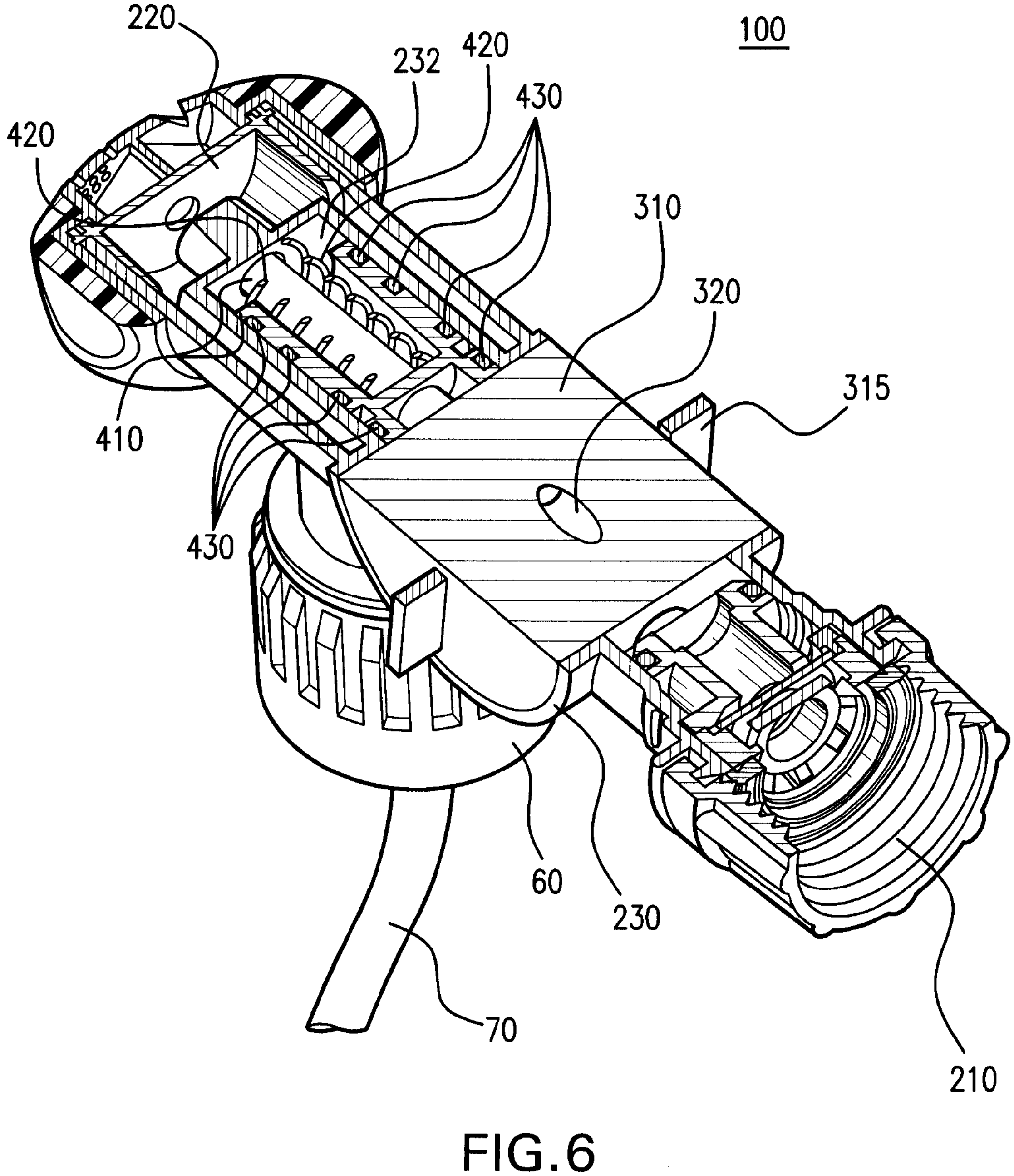
FIG. 6 is a rear perspective, top down sectional view of the embodiment as illustrated in FIG. 2.
Figure 7:
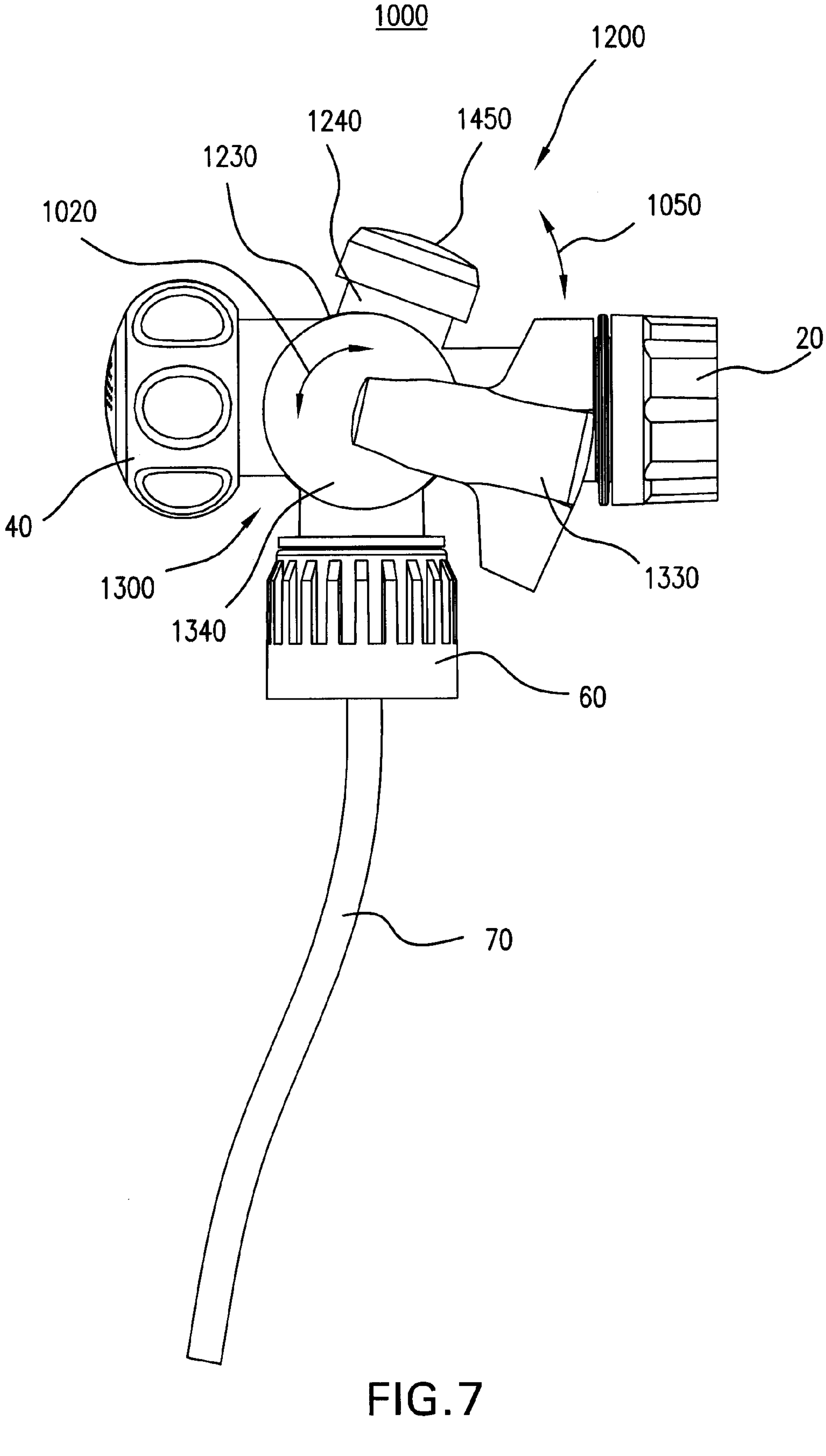
FIG. 7 is an elevational view of an alternate embodiment of a system formed in accordance with the present invention, in an OFF configuration.

In the exemplary embodiment shown, the control valve 300 includes a rotary member 310 angularly displaceable along the direction indicated by arrows 305. It is so disposed within an accommodating space formed in the housing intermediate portion 230. A bore-like fluid conduit 320, preferably formed diametrically through the rotary member 310, may then be angularly positioned to one of several predetermined settings, preferably including: closed, bypass, and open settings. In FIG. 1 and its corresponding perspective sectional view of FIG. 1A, the fluid conduit 320 is set to the closed position, wherein its distal end 324 abuts (and is substantially blocked by) an inner surface of the housing's accommodating space, such that passage of the pressurized fluid through the conduit 320 is effectively blocked. In the corresponding FIGS. 2 and 2*a*, the fluid conduit 320 is set to the bypass (or rinse) position, in which it directs the flow of pressurized fluid entering its proximate end 322 to a bypass channel 215 that bypasses the response valve 400 and leads directly to the outlet 220. In corresponding FIGS. 3 and 3A, the fluid conduit 320 is set to the open position, where it substantially aligns with, and extends between, the inlet 210 and response valve 400. Preferably, a control member 315 is provided for readily accessible manual displacement along the direction indicated by arrows 307 to correspondingly position the rotary member 310 within the housing 200.

The location of the bypass position relative to the open and closed positions is preferably at an intermediate point between them, as in the embodiment illustrated. This allows a limited amount of pressurized fluid to flow from the fluid conduit 320 through the bypass channel 215, to the outlet 220, as the control valve's rotary member 310 passes while turning from the on position back to its closed position. One advantage is the flushing effect this has on any residual mixed product which may otherwise remain at the outlet upon shut-off. In addition, the back pressure resulting at the outlet end of the piston member 410 provides a measure of force to 'push' the piston member 410 back away from the outlet 220, aiding the piston member's quick and complete spring biased return to its inactive position.

The response valve 400 in the exemplary embodiment shown includes a displaceable assembly that may be displaced relative to the housing 200 between active and inactive positions. This is realized, for example, in the form of a piston member 410 disposed in axially displaceable manner, as indicated by directional arrows 405, within a receiving compartment 232 defined by the housing 200. The piston member 410 is preferably biased by a resilient member to one of its active and inactive positions. In the illustrated embodiment, the default position is the inactive position. That is, the piston member 410 is biased—or spring loaded—by a coil spring element 420 to its inactive position, away from the outlet 220 (and towards the control valve 300).

The piston member 410 is formed with an interface end 412 from which a mixing chamber 414 axially extends forward in bore-like manner, towards the outlet 220. A passage preferably configured as a transverse venturi aperture 416 leads from the mixing chamber 414 through to an outer surface of the piston member 410. In the response valve's inactive position (as shown in FIGS. 1, 1A and 2, 2A), this venturi aperture 416 is obstructed by an abutting inner surface of the immediately surrounding housing portion, while in the response valve's active position, it aligns with the housing's admission port 231 to open a path of access between the liquid material source and the mixing chamber 414.

The resilient member biasing the piston member 410 may be of any suitable type known in the art, such as the coil spring element 420 shown. It preferably applies a sufficient biasing force upon the piston member 410 to hold the default position until an opposing force sufficient to overcome the biasing force is applied thereto by an incoming flow of pressurized fluid emerging from the control valve's fluid conduit 320. Preferably, the biasing force applied by the resilient member is such that it may be amply overcome by the typical fluid flow pressures to be encountered in the intended application, yet is firm enough to resist stray forces which may be applied quite unintentionally and unexpectedly applied to the piston member 410 by various sources of potential disturbance, such as shock due to dropage, seepage of fluid through the control valve 300, and the like. In that regard, system 100 is preferably of an overall construction which guards suitably against open external access to the piston member 410, lest manual depression, obstruction, or other direct disturbance occur.

When the control valve 300 is set to its open configuration, and when a sufficiently pressurized flow of fluid passes concurrently through the fluid conduit 320, the fluid emerging from the fluid conduit's distal end 324 flows against the piston member's interface end 412. Not only does this impart a force upon that interface end 412, the pressurized accumulation of fluid resulting there builds up sufficient pressure to cause a responsive displacement of the piston member 410 against its spring loaded bias. The piston member 410 retracts until, either the opposing end 415 is stopped against the rear inner wall of the receiving compartment 232 or, alternatively, the force applied by the spring element 420 as it is compresses equalizes the pressure generated responsive to the pressurized fluid flow. In either case, the venturi aperture 416 is positioned such that it substantially aligns with the admission port 231 when the piston member 410 assumes its predetermined active position. As a portion of the pressurized fluid continues to flow through the piston member's mixing chamber 414, the given liquid material (whose source is coupled to the neck 240) is drawn through the admission port 231, through the venturi aperture 416, and into the fluid flow's path for subsequent mixture and expulsion therewith out through the outlet 220 and spray nozzle 440.

The aspiration required for such operation is preferably effected through at least first and second vent ports 233, 235 provided in the housing's intermediate portion 230. A plurality of seal members, preferably in the form of suitable O-rings are disposed about an outer surface of the piston member 410, preferably within accommodating annular recesses formed in that outer surface. When the piston member 410 assumes its inactive position, these seal members 430 bear against the surrounding walls of the receiving compartment to isolate the vent port 235 (disposed inside the neck 240) from the vent port 233 (disposed outside the neck 240) to prevent any seepage of air or liquid therebetween. When the piston member 410 assumes its active position, however, the seal members 430 are sufficiently displaced with the piston member 410, away from its intervening position between vent ports 235 and 233, unsealing to permit fluid communication between them. Atmospheric air is thereby permitted to enter the attached liquid container's interior to act on the liquid material contents.

In overall operation, then, the response valve 400 prevents the given liquid material from escaping through the admission port 231 when operational conditions are not present. That is, the outer side wall of its piston member 410 blocks the admission port 231 when in the inactive position shown in FIGS. 1, 1A and 2, 2A. A pair of seal members 430 serve in this position to seal against the seepage of any liquid material between the piston member 410 and the surrounding wall of the receiving compartment 232. Any such escaping liquid material is contained by the bounding seal members 430 such that the material would, if anything, fall back into the storage container via the admission port 231 itself, or via the immediately neighboring vent port 235.

In accordance with one aspect of the present invention, then, manipulating the control valve 300 to its open configuration is not alone sufficient to activate the response valve 400. A fluid flow of sufficient pressure to overcome the bias force maintained by response valve 400 must also be present for its activation.

The housing 200 is preferably formed of hard plastic or other suitable material known in the art of sufficient strength, rigidity, and durability to withstand the conditions typically encountered in the intended application. In applications posing particularly harsh conditions, considerations such as anti-corrosion, thermal expansion, and the like may be significant factors determining the choice of materials for various portions of system 100. The present invention is not limited to a particular choice of materials, as such choice will depend on the particular requirements of the intended application.

Turning now more closely to the structure for coupling a container or other source of the liquid material (highly concentrated lawn treatment chemical, for instance), a suction tubing 70 positioned with an upper end engaging a nipple 242 and a lower end extending to the bottom of the given container (not shown). If the container is of the type having a threaded opening, it may be threadedly engaged with the adapter 60 for suspension therefrom. Within the adapter 60, a seal 62 such as a flattened O-ring or washer is preferably provided at the sprayer-container interface to prevent air and liquid material leakage. Other attachments such as snap-on, lock-in-key, dovetail, or other such coupling mechanisms known in the art may be alternatively employed.

Various alternative embodiments may be realized in accordance with the present invention. In certain alternative embodiments, for example, the spray nozzle 40 may be replaced by another downstream flow control valve device such as an extension wand or other fluid-conducting attachment coupled to the outlet 220. In certain other exemplary embodiments, an optional detent ball mechanism or other such retaining device may be incorporated in the control valve 300 to give tactile feedback when the valve 500 is optimally positioned for a particular function. Such a detent ball mechanism may be seated with a biased ball partially received within a recess formed in the control valve accommodating space within which the rotary member 310 is seated. One or more corresponding detent recesses may then be formed in the opposing surface of the rotary member 310.

With particular respect to operation when the control valve 300 is set to its open configuration, among the forces overcome by the pressure build up at the piston member interface end 412 are not only the biasing force exerted by a coil spring 420, but also inertial forces due to such things as the friction generated between the piston member and the surrounding inner surfaces of the receiving compartment 232. This friction is exacerbated by the O-rings 430, seated in the circumferential grooves/recesses formed on the piston member's exterior. In certain alternative embodiments, then, a biasing member is obviated by the inertial drag collectively generated by a suitable plurality of static seal members 430. The resultant 'O-ring drag' in such embodiments is sufficient to retain the piston member 410 in the inactive position in the absence of pressurized fluid flow thereto through an open control valve 300. The piston interface end 412 on which the pressurized fluid acts to create a displacement force preferably remains unexposed to points outside of the housing 200, so as to prevent unwanted mechanical manipulations, via a pencil or other foreign object.

In those alternate embodiments where a extension wand having a flexible hose for accurate spot location of the delivered stream is employed at the outlet 220, and the wand is itself equipped with an on/off control mechanism, the response valve 400 serves to protect the container's contents by closing fluid communication between the container and the piston valve compartment. More specifically, when the wand on/off valve is open and the response valve 400 is activated, admission of the concentrated chemical or other given liquid material into the pressurized flow is permitted. When the wand valve is turned off, the fluid pressure quickly equalizes on both sides of the biased piston valve, allowing the piston member's biased return to its inactive position—even if the control valve 300 were still in an open configuration at that instant.

The O-rings forming the seal members 430 in the embodiment shown are preferably formed of a suitable elastomeric material known in the art. They provide hermetic sealing of the interface between the piston member 410 and the immediately opposing sidewalls of the receiving compartment 232. As mentioned in preceding paragraphs, the O-rings serve to fluidically separate certain sections of the piston member 410. Preferably, enough seal members 430 are employed such that proximal and distal O-rings are disposed adjacent the opposed axial ends of the piston member 410 so to provide hermetically sealed protection for most of the piston member's length.

Figure 8:
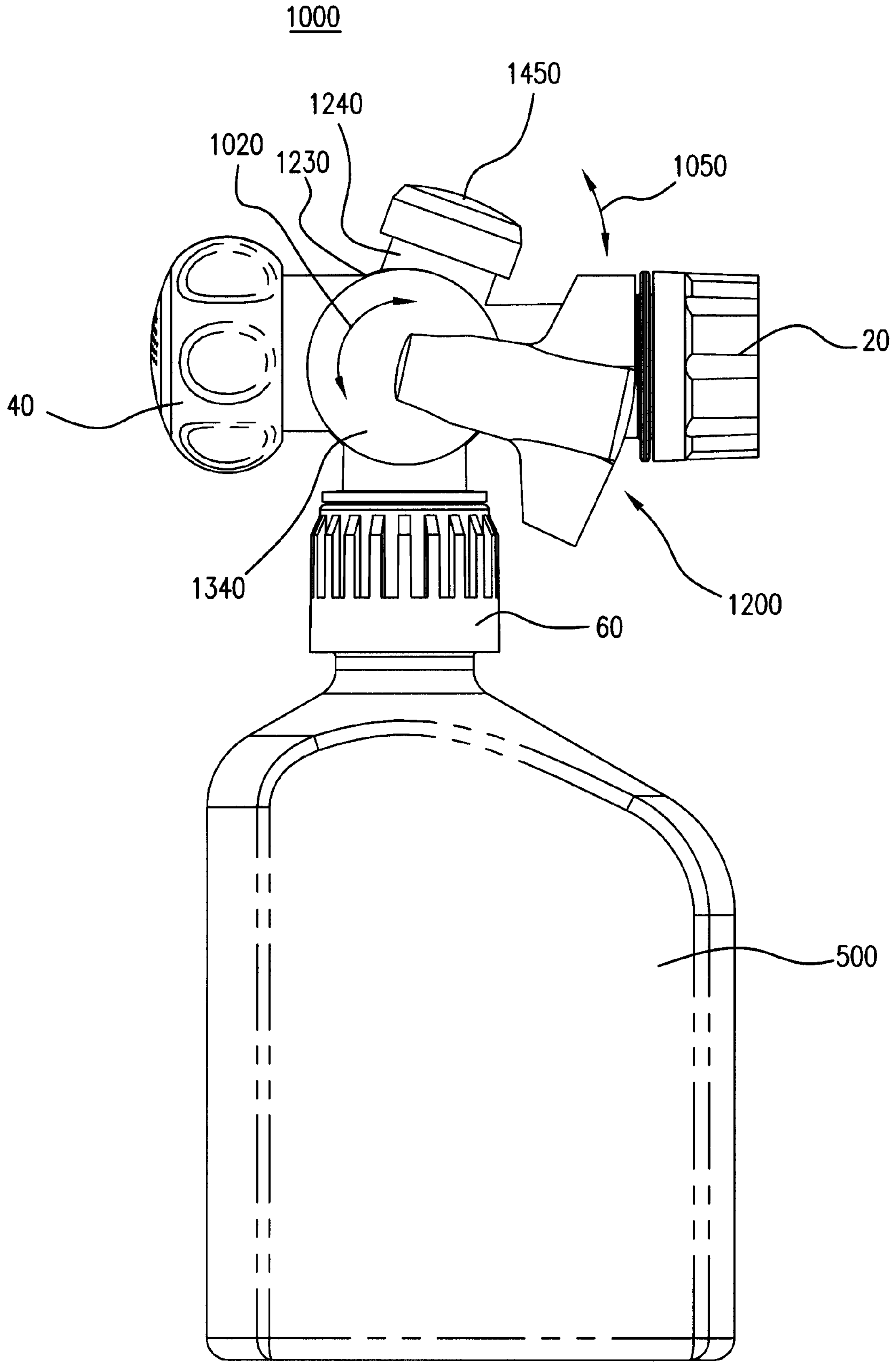
FIG. 8 is an elevational view of the embodiment shown as illustrated in FIG. 7, attached to a liquid material container.
Figure 9:
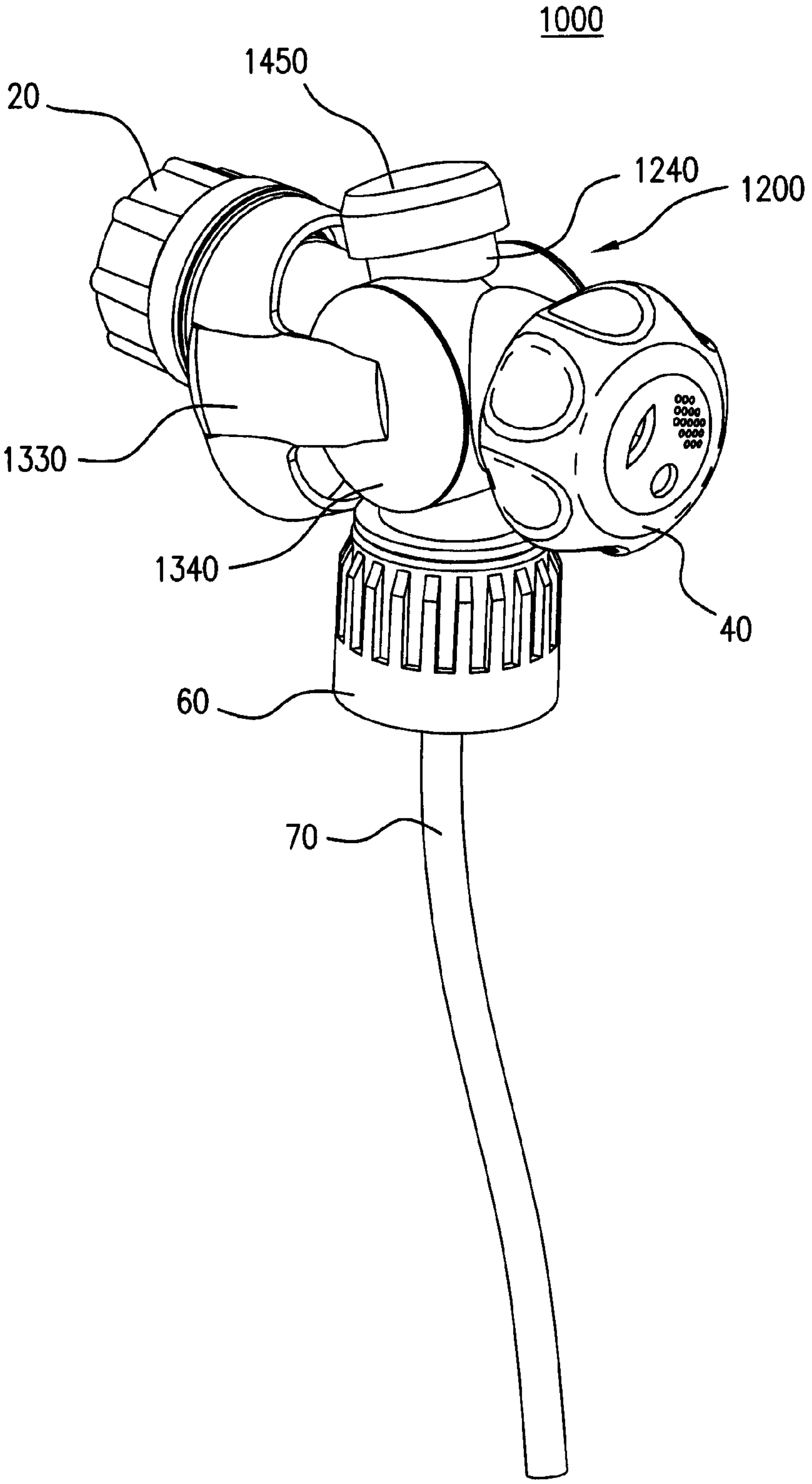
FIG. 9 is a front perspective view of the embodiment as shown in FIG. 7.
Figure 10:
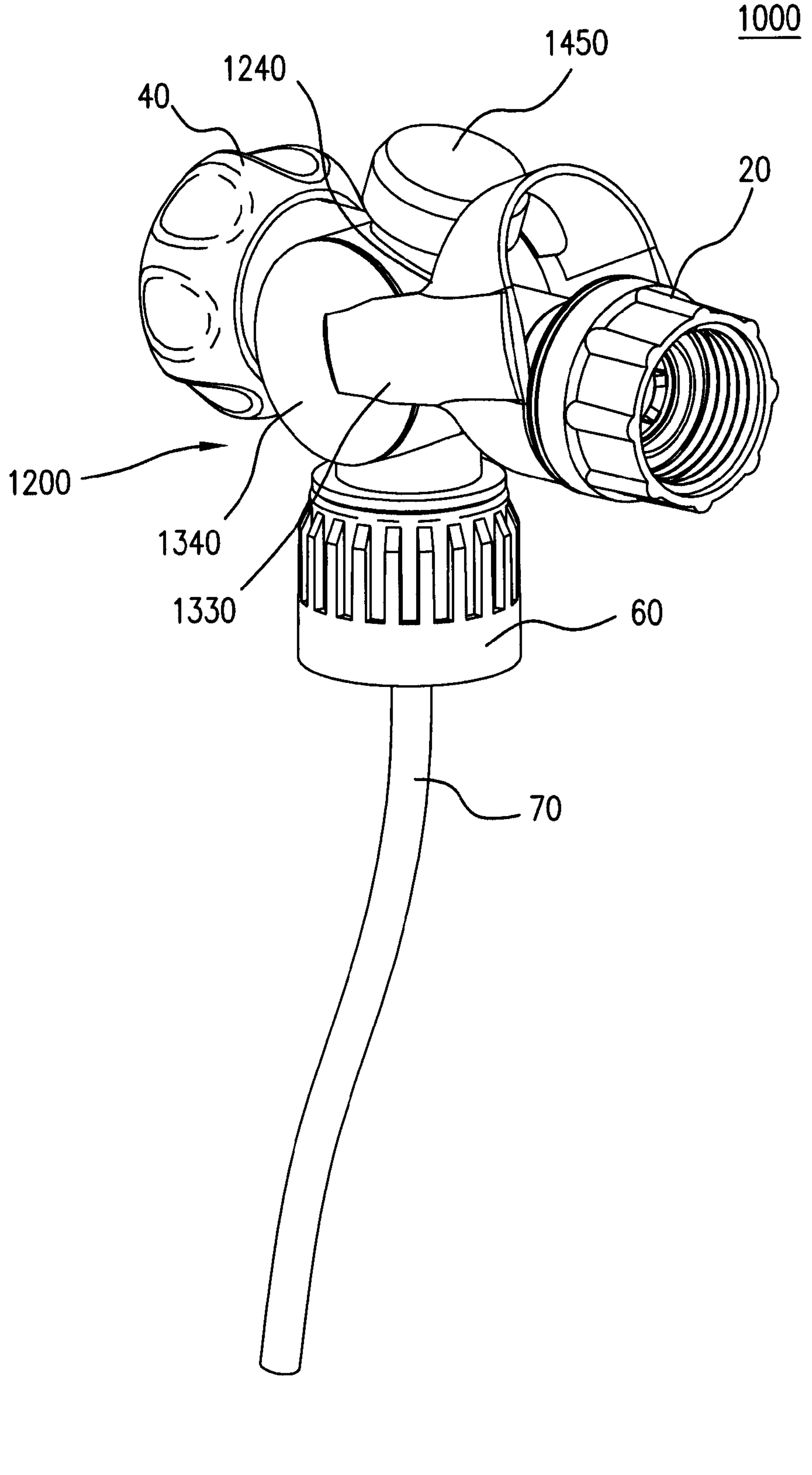
FIG. 10 is a rear perspective view of the embodiment of FIG. 7, in an ON configuration.

Referring now to FIGS. 7-15, there is illustrated another exemplary embodiment of the present invention. Like reference numbers are used in these FIGS. to denote the same or substantially the same elements as those shown in the preceding embodiment. System 1000 formed in accordance with this embodiment generally includes a housing 1200 having an intermediate portion 1230 to which a central valve assembly 1300 is coupled. As shown in FIG. 8, among others, the system 1000 is of the type which may be coupled for use to a top opening, or neck, of a bottle-like container 500 which holds the liquid material to be safely dispensed.

Briefly, the central valve 1300 in this embodiment effectively combines the functions generally served by the control valve 300 and response valve 400 in the preceding embodiment. It is formed internally with a suitable channeling structure which, as in the preceding embodiment, aligns with an admission port 231 to enable the given liquid material to be drawn from its source and appropriately dispensed. Preferably, the channeling structure includes a bore-like fluid conduit 1342 extending diametrically through the central valve assembly's main body portion 1340 and a venturi aperture 1346 branching from that fluid conduit 1342. Angular displacement of the main body portion 1340 relative to the housing 1200 (as indicated by directional arrows 1020 and 1050) then controls the selective alignment of the venturi aperture 1346 with the admission port 231.

Figure 14:
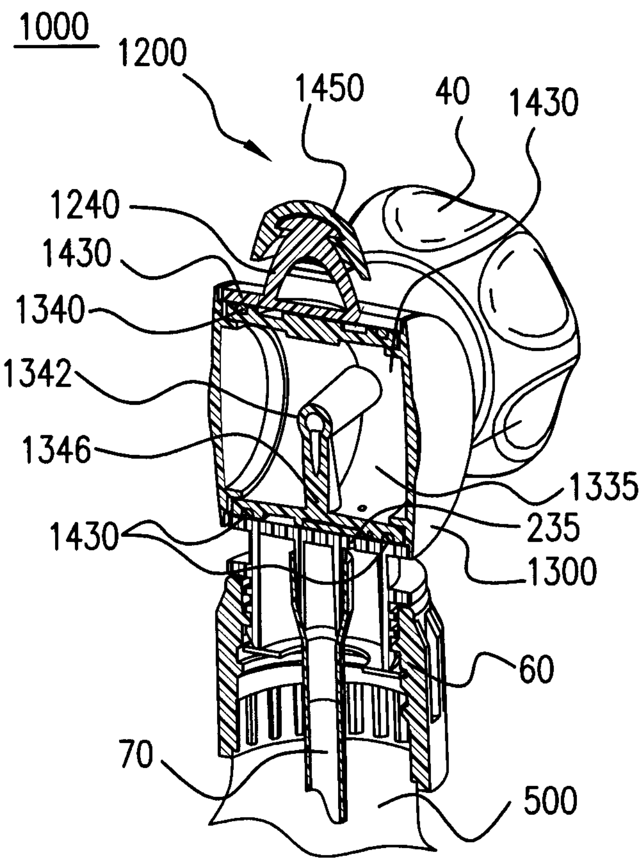
FIG. 14 is a rear perspective view of a front section portion of the embodiment as shown in FIG. 8; and, FIG. 15 is a rear perspective sectional view of the embodiment as illustrated in FIG. 12C, sectioned through a non-centered sectioning line.
Figure 15:
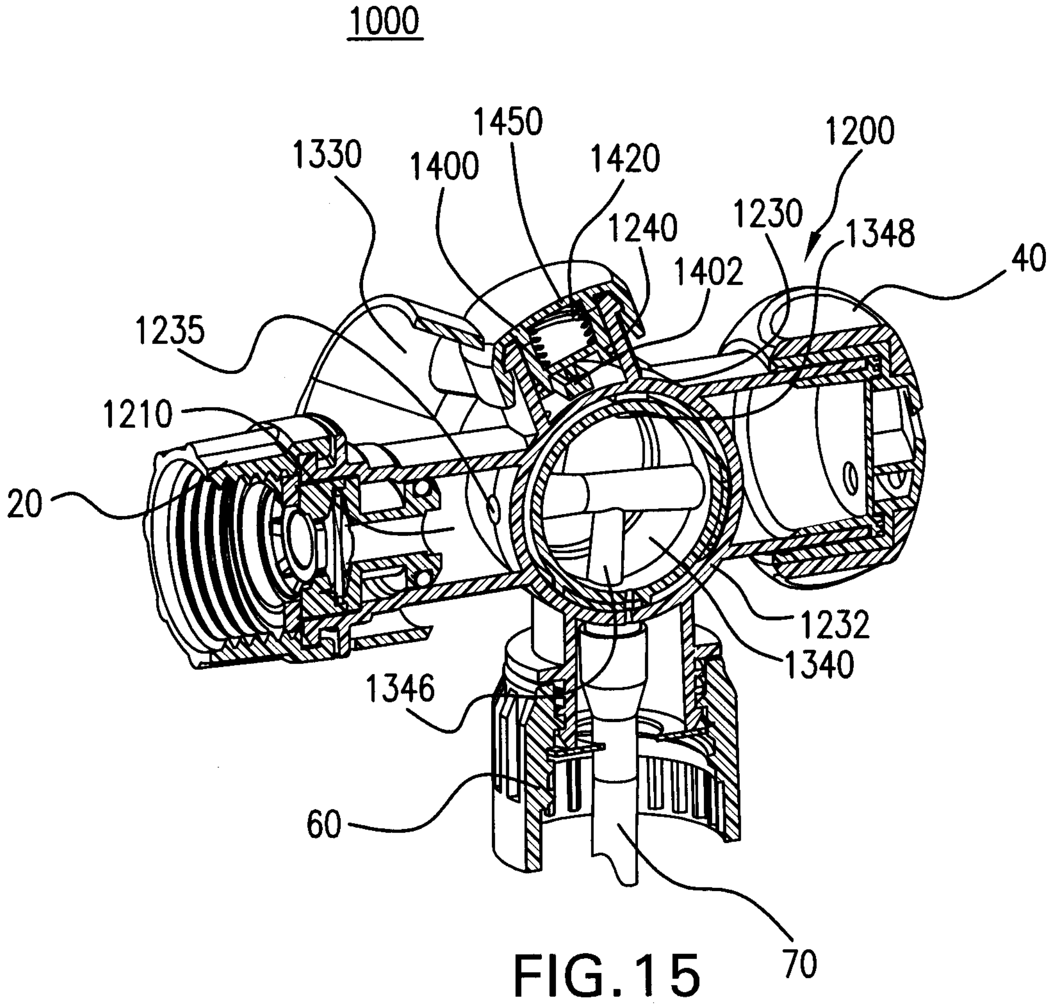

When aligned, the admission port 231 and fluid conduit 1342 are in open communication, whereby the liquid material may be drawn into the housing for mixed dispensing with that portion of the pressurized fluid stream passing through the fluid conduit 1342. At other angular positions of the main body portion 1340 relative to the housing 1200, the venturi aperture 1346 is turned out of alignment with the admission port 231, such that the admission port is closed off by a sealing wall surface 1344 of the main body portion 1340 and any suitable seal members 1430 (as illustrated in FIG. 14) provided therewith.

Figure 12A:
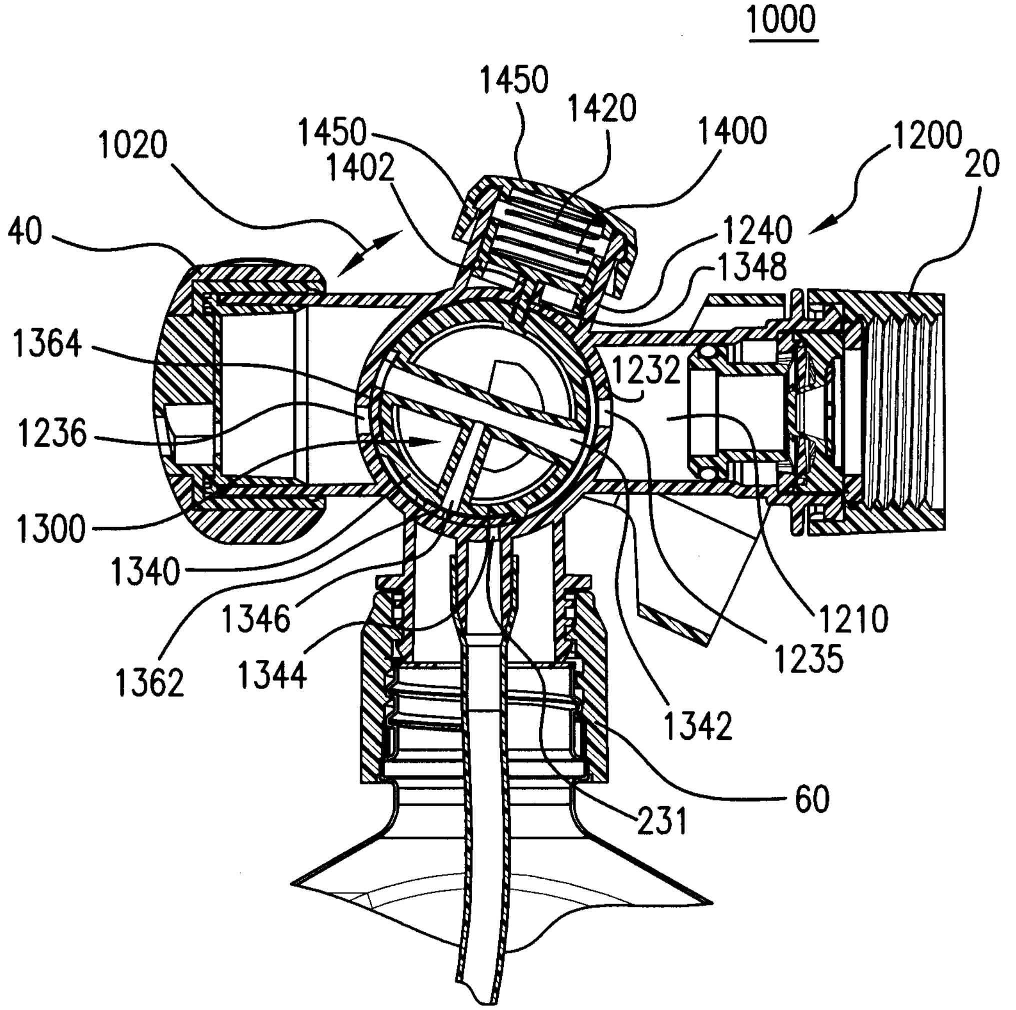
FIG. 12A is an enlarged view, partially cut away of the embodiment as shown in FIG. 11.
Figure 12B:
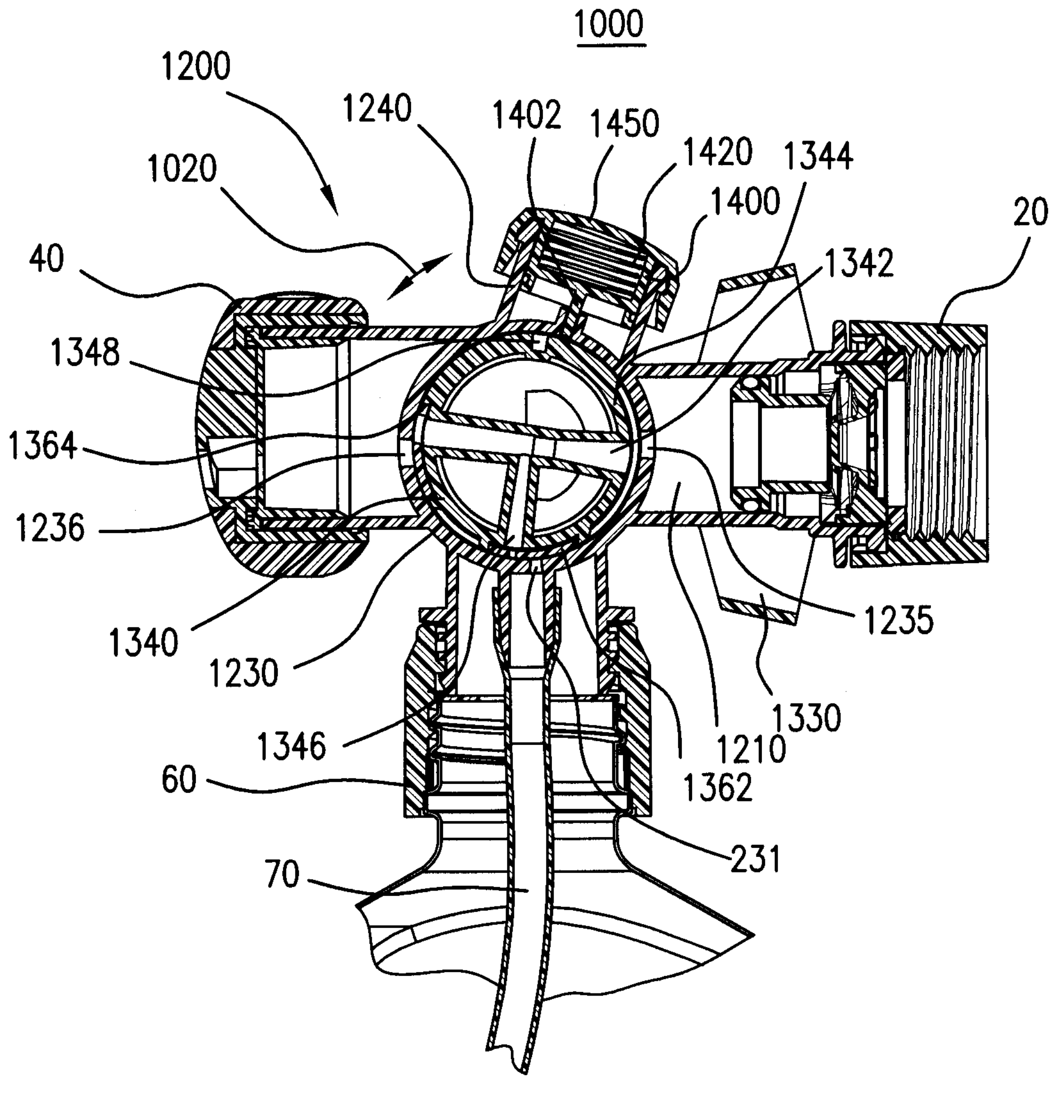
FIG. 12B is an enlarged sectional view corresponding to the embodiment of FIG. 12A, but in an intermediate operational configuration.
Figure 12C:
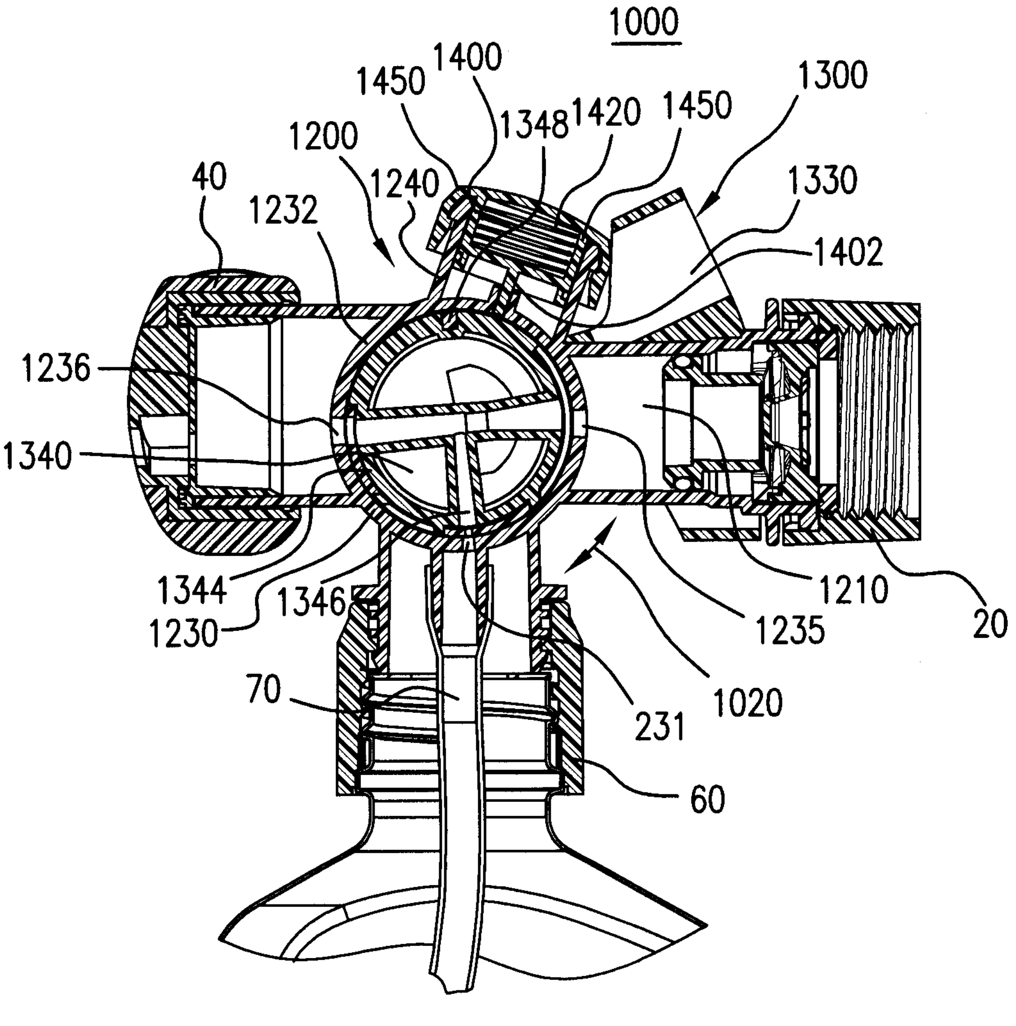
FIG. 12C is an enlarged sectional view corresponding to the embodiment of FIG. 12A, but in an ON operational configuration.
Figure 13A:
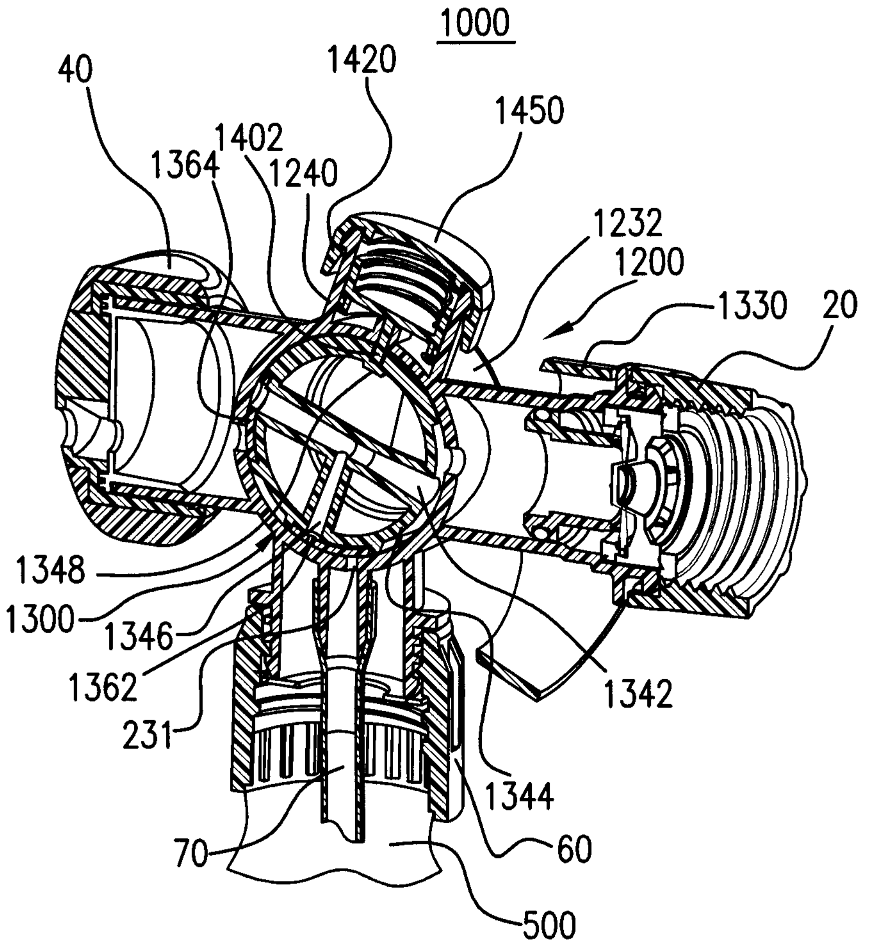
FIG. 13A is a rear perspective sectional view of the embodiment as illustrated in FIG. 12A.
Figure 13B:
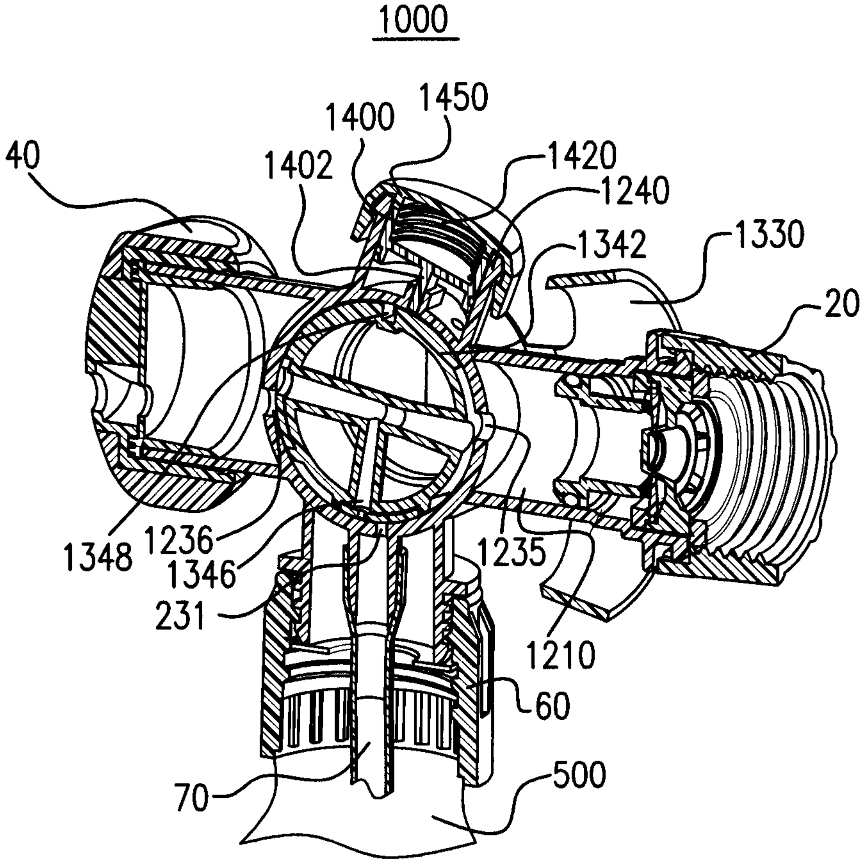
FIG. 13B is a rear perspective sectional view of the embodiment as illustrated in FIG. 12B.
Figure 13C:
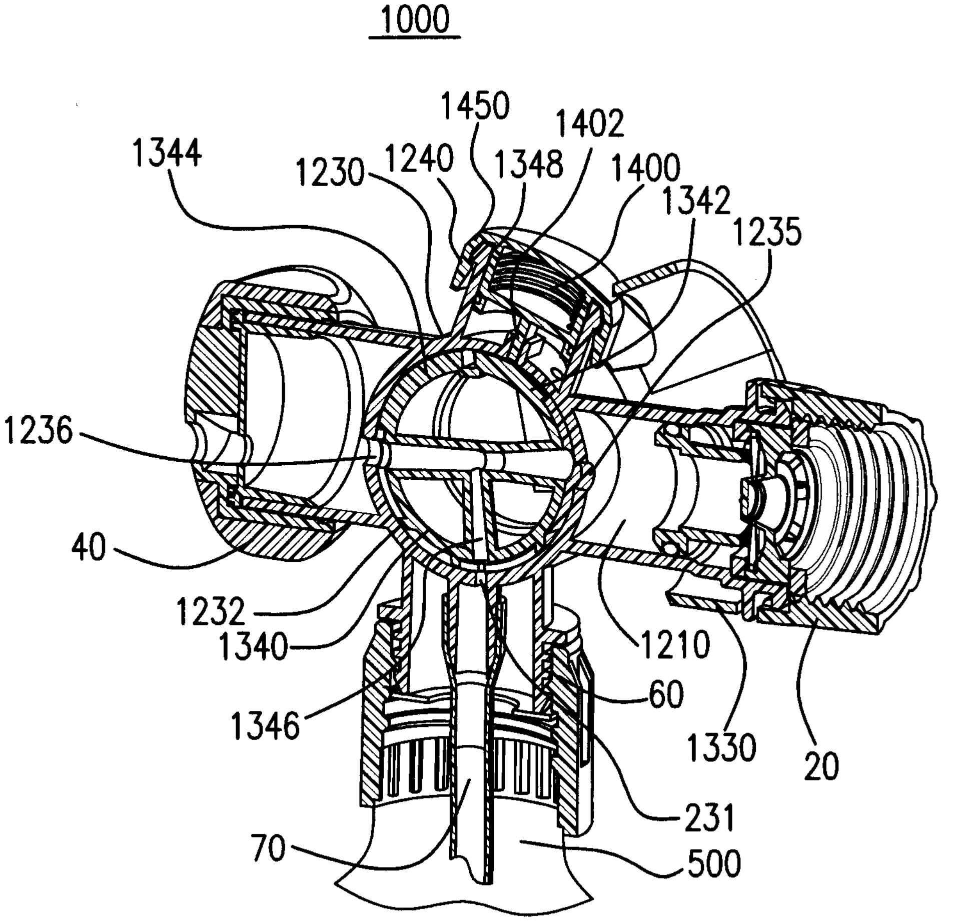
FIG. 13C is a rear perspective sectional view of the embodiment as illustrated in FIG. 12C.

FIGS. 12A, 12B, and 12C (as well as FIGS. 13A-C) respectively illustrate in sequence the closed/inactive, intermediate, and open/active positions of the central valve assembly 1300 relative to the housing's intermediate portion 1230. In accordance with this particular embodiment, the central valve assembly 1300 is mechanically interlocked to the housing 1200, preferably in its closed or inactive angular position. This mechanical interlock, which disables the central valve assembly 1300 from activation, may be properly overcome only when a sufficiently pressurized stream of fluid is suitably introduced into the flow path defined by the housing 1200. In the absence of such pressurized fluid stream, the interlocking mechanism remains engaged, inaccessible as it is from outside the housing 1200 that it cannot be readily defeated by mechanical manipulation.

In this embodiment, the main body portion 1340 is seated within a generally cylindrical chamber 1232 defined transversely through the housing's intermediate portion 1230. The main body portion 1340 is correspondingly shaped and dimensioned such that it may turn within this transverse chamber 1232 unless otherwise obstructed. Such obstruction is interposed in the form of a retractable locking member 1400 positioned within a compartment 1240 situated outside the chamber 1232. The locking member 1400 includes a protruding boss 1402 that extends into the transverse chamber 1232 when the locking member is in its locking position, to engage a recess 1348 formed in the valve assembly's main body portion 1340. The central valve assembly 1300 is thereby interlocked to the housing 1200, preferably at its inactive position.

The locking member 1400 is retained within the auxiliary compartment 1240 preferably by a retaining cap 1450. A resilient member, such as a coil spring 1420 is captured between the locking member 1400 and retaining cap 1450, biasing the locking member 1400 towards the transverse chamber 1232. The protruding boss 1402 is thus urged to extend into the chamber 1232 unless pushed back by a pressure sufficient to overcome the spring's biasing force.

Within the housing 1200, fluid flow access into and out of the transverse chamber 1232 is provided through axially opposed access openings 1235, 1236. Except at the respective outlet ends of the central valve's venturi outlet port 1346 and fluid conduit 1342 (where suitable sealing measures 1362, 1364 are employed), sufficient (though minute) clearance is provided between the opposing surfaces of the relatively movable main body portion 1340 and transverse chamber 1232 to permit fluid communication therebetween. When a suitably pressurized stream of fluid is then directed into the flow path 1210 defined in the housing 1200, it passes through the access opening 1235 into the chamber 1232. The entering fluid quickly disperses through the clearance space between the valve's main body portion 1340 and inner walls of the chamber 1232 until the resulting build up of pressure therein urges the locking member 1400 away from the chamber 1232, causing the consequent retraction of the protruding boss 1402. Upon full withdrawal of this boss 1402 from recess 1348, the central valve 1300 is unlocked, or enabled, for angular displacement to its active configuration. A user at this point may effect the activating displacement necessary via a lever handle 1330 extending externally from the main body portion 1340.

While the valve assembly 1300 is in its active configuration, the locking boss 1402 remains retracted and out of the valve's way. When the pressurized fluid stream is interrupted, however, the opposing build up of pressure is lost, and the locking member 1400 is again freed to advance by force of the biasing spring and extend its protruding boss 1402 into the chamber 1232. This can only occur when the valve assembly 1300 is returned to its inactive configuration, and the recess 1348 comes to be aligned again with the protruding boss 1402 to receive its interlocking engagement.

Referring to the cross-wise sectional view shown in FIG. 14, certain features not visible in the lengthwise sectional views of the other FIGS. are visible here. In particular, a vent port 235 is provided to remain effectively sealed off from the other portions of the system 1000 by the central valve's main body portion 1340 and cooperating O-ring type seal members 1430, when the central valve assembly 1300 is in anything other than its active configuration. When the valve assembly 1300 is in its active configuration as shown, a corresponding vent opening 1335 formed through the sealing wall surface 1344 of the main body portion 1340 aligns with the vent port 235 to permit the required aspiration therethrough. Sufficient fluid communication occurs for adequate venting between the vent opening 1335 and the air outside the housing 1200, much as in the preceding embodiment, through unsealed joints and/or minute gaps at the interface of moving components found in the resulting structure, as well as through any supplemental apertures which may be suitably formed in the structure for that purpose.

Depending on the requirements of the intended use, it may be preferable in practice to use the hydraulic source pressure for direct control of the liquid material container's sealing valve as in the first embodiment, rather than for unlocking a valve controlled by other means, as in the present alternate embodiment. One practical drawback is that the interlocking mechanism could be damaged and/or defeated more readily by forcible means. Even so, such hydraulically activated interlock embodiment provides still a higher level of safety than heretofore afforded by comparable devices known in the art.

Numerous alternate embodiments of the present invention other than those illustrated in the FIGS. herein abound. In one such alternate embodiment, the valve assembly may be housed within the liquid material's container itself, to further guard against unwanted tampering. The container is provided with suitable inlet and outlet access points for receiving the required stream of pressurized fluid from a source and delivering the liquid material in appropriate amount for proper expulsion.

A few of the many other variations in structural embodiments formed in accordance with the present invention include, for example, the incorporation of:

1. A shuttle type check valve with a spring return (of the type illustrated in FIGS. 1-6)—but having direct feed with or without a rinse function built into the assembly.
2. A piston valve on a liquid material feed line with a control valve (digital or metering) downstream of the piston but before Venturi introduction into the pressurized fluid stream.
3. A control knob which is spring loaded on axis to be biased down against a gear or toothed/splined surface to prevent rotation, wherein fluid pressure pushes the control knob away from gear teeth/splined surface to allow free rotation.
4. A piston valve located in the throat or neck of the liquid material container such that when the sprayer is removed, the contents remain protected (contained safely within the container), its flow from the container being permitted only when a suitable sprayer is attached to the container and fluid pressure is provided to move the piston valve (to open flow access and admit atmospheric pressure into the container).
5. A piston valve located onboard a sprayer device but extending a push rod into a cavity in an actuating valve disposed at the liquid container's neck to open a port for product flow from container into the sprayer device.
6. Bellows within a sprayer device which expands when fluid pressure is provided to push a rotating, swinging, or sliding valve to open a port for product flow from the container, and which self-retracts under its own molded/formed-in spring force.
7. Bellows within a sprayer device which expands when fluid pressure is provided to push a rotating element that actuates a push rod (on the sprayer device), and which extends into the container's neck to actuate a valve to open a port for product flow from container into sprayer device.
8. Measures to use Venturi-generated vacuum to apply differential pressure to a piston valve which then opens one or more ports to the container.
9. User control means having a two-piece telescoping structure, in which the interior comprises a piston like arrangement. When water or other fluid is present and pressurized, the control knob is expanded so that surface gear teeth formed at a bottom surface engage with a corresponding rack formed on a sliding valve mechanism controlling the ports to the given container(s). A spring mechanism biases such telescoping control knob in its closed condition.

In addition to that described herein, use of hydraulic pressure to "un-lock" a valve assembly to allow dispensing may operate in several different manners depending on the particular application and type of aspiration device used within a sprayer dispenser type device. It certain embodiments, the hydraulic pressure may simply force a spring loaded pin to move, unlocking the control assembly for activation by rotating and/or sliding movement, for example. In other embodiments, the hydraulic pressure may force a spring return spool valve to slide to a position which places the container contents in communication with appropriate openings/orifices formed in the sprayer dispenser device.

For applications utilizing a Venturi style aspiration technique, the hydraulically activated interlock/seal mechanism may form a part of a back flow prevention device typically required for hose end mounted dilution systems. For units using a flow-by style of aspiration (no back flow prevention required), the interlock/seal mechanism may form a part of a carrier stream flow control assembly, such that the mechanism is operable responsive to applied hydraulic pressure, irrespective of carrier stream control assembly's condition (static or dynamic).

Although this invention has been described in connection with specific forms and embodiments thereof, it will be appreciated that various modifications other than those discussed above may be resorted to without departing from the spirit or scope of the invention. For example, equivalent elements may be substituted for those specifically shown and described, certain features may be used independently of other features, and in certain cases, particular combinations of method steps may be reversed or interposed, all without departing from the spirit or scope of the invention as defined in the appended claims.

What is claimed is:

1. A system for dispensing a predetermined liquid material from a source container in failsafe controlled manner comprising:

a housing for receiving a pressurized fluid stream, said housing having an inlet, an outlet, and an intermediate portion extending therebetween, said intermediate portion having formed therein an admission port for admission of the predetermined liquid material therethrough;

a selectively operable valve assembly seated in displaceable manner within said intermediate portion of said housing to selectively activate a flow path between said inlet and said outlet, said valve assembly alternatively opening and closing said admission port responsive to said flow path activation for selective access of the predetermined liquid material into said housing, said valve assembly being operably actuated responsive at least in part to the pressurized fluid stream in said flow path;

whereby admission of the predetermined liquid material into said housing is keyed by introduction of the pressurized fluid stream into said flow path with a portion of the pressurized fluid extending from said flow path to pass through a clearance between displaceably opposed surfaces of said valve assembly and intermediate portion.

2. The system as recited in claim 1, wherein said valve assembly in a disabled position is mechanically interlocked to said housing in resiliently biased manner, said valve assembly being automatically released from said mechanical interlock by application of the pressurized fluid stream thereon, and thereby enabled for activation.

3. The system as recited in claim 2, wherein said valve assembly is disposed in angularly displaceable manner within said housing.

4. A system for failsafe controlled dispensing of a predetermined liquid material from a source container comprising:

a housing for receiving a pressurized fluid stream, said housing having an inlet, an outlet, and an intermediate portion extending therebetween, said intermediate portion having formed therein an admission port for admission of the predetermined liquid material therethrough; and, a selectively enabled valve assembly seated in displaceable manner within said intermediate portion of said housing to selectively activate a flow path between said inlet and said outlet, said valve assembly alternatively opening and closing said admission port responsive to said flow path activation for selective access of the predetermined liquid material into said housing, said valve assembly is releasably locked in said housing;

wherein said valve assembly is released from said housing for displacement between inactive and active configurations responsive to passage of the pressurized fluid stream in through said inlet, with a portion of the pressurized fluid extending from said flow path to pass through a clearance between displaceably opposed surfaces of said valve assembly and intermediate portion;

wherein admission of the predetermined liquid material into said housing is enabled by said valve assembly being in said active configuration.

5. The system as recited in claim 4, wherein said valve assembly when in said active configuration is maintained therein responsive to passage of the pressurized fluid stream in through said inlet.

6. The system as recited in claim 4, wherein said intermediate portion of said housing has formed therein a plurality of vent ports offset from said admission port, and said valve assembly includes a plurality of seal members disposed to isolate said vent ports one from the other in sealed manner when said valve assembly is disposed in said inactive position, and to maintain at least a pair of said vent ports in fluid communication one with the other when said valve assembly is disposed in said active position.

* * * * *